(12) United States Patent
Lloyd et al.

(10) Patent No.: US 10,990,971 B2
(45) Date of Patent: *Apr. 27, 2021

(54) NON-INTRUSIVE GEO-LOCATION DETERMINATION ASSOCIATED WITH TRANSACTION AUTHORIZATION

(71) Applicant: BANK OF AMERICA CORPORATION, Charlotte, NC (US)

(72) Inventors: Gregory Joseph Lloyd, Charlotte, NC (US); Lauren Marie Zavodny, Charlotte, NC (US); Tony England, Tega Cay, SC (US); Stephen Philip Selfridge, Huntersville, NC (US); James Gregory Ronca, Decatur, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/550,832

(22) Filed: Aug. 26, 2019

(65) Prior Publication Data
US 2019/0378135 A1    Dec. 12, 2019

Related U.S. Application Data

(63) Continuation of application No. 14/871,964, filed on Sep. 30, 2015, now Pat. No. 10,453,059.

(51) Int. Cl.
*G06Q 40/00* (2012.01)
*G06Q 20/40* (2012.01)
*G06Q 20/32* (2012.01)

(52) U.S. Cl.
CPC ....... *G06Q 20/401* (2013.01); *G06Q 20/3224* (2013.01)

(58) Field of Classification Search
CPC . G06Q 20/3224; G06Q 30/0601; G06Q 20/40
See application file for complete search history.

(56) References Cited

U.S. PATENT DOCUMENTS

| 7,177,838 | B1 | 2/2007 | Ling |
| 7,328,189 | B2 | 2/2008 | Ling |

(Continued)

FOREIGN PATENT DOCUMENTS

| EP | 1132876 A2 | 9/2001 |
| WO | 2012058099 A1 | 5/2012 |

(Continued)

OTHER PUBLICATIONS

Mobile Payments in the United States Mapping Out the Road Ahead, Darin Contini and Marianne Crowe, Federal Reserve ;Bank of Boston, Cynthia Merritt and Richard Oliver, Federal Reserve Bank of Atlanta, (Year: 2011).*

(Continued)

*Primary Examiner* — Mike Anderson
(74) *Attorney, Agent, or Firm* — Michael A. Springs; Moore & Van Allen PLLC; Vaidehi Bachoti

(57) ABSTRACT

Embodiments of the invention are directed to systems, methods, and computer program products for non-intrusive geo-location determination associated with transaction authorization. The invention enables one or more transactions initiated by a user to be authenticated and/or validated based on, at least in part, determined locations of the user relative to the locations of the one or more transactions. The user location is determined by transmitting one or more queries to a user device. The system determines the validity of the one or more transactions based on at least comparing the transaction location to the user location, before enabling further processing of the one or more transactions. The present invention is advantageous since it enables authentication/authorization of one or more transactions associated (Continued)

with the user by utilizing the user location, while precluding any inadvertent privacy concerns.

20 Claims, 11 Drawing Sheets

(56) References Cited

U.S. PATENT DOCUMENTS

| | | | |
|---|---|---|---|
| 7,606,560 B2 | 10/2009 | Labrou et al. | |
| 7,657,489 B2 | 2/2010 | Stambaugh | |
| 7,734,527 B2 | 6/2010 | Uzo | |
| 7,784,684 B2 | 8/2010 | Labrou et al. | |
| 7,848,980 B2 | 12/2010 | Carlson | |
| 7,992,779 B2 | 8/2011 | Phillips et al. | |
| 8,032,932 B2 | 10/2011 | Speyer et al. | |
| 8,171,531 B2 | 5/2012 | Buer | |
| 8,249,805 B2 | 8/2012 | de Silva et al. | |
| 8,327,428 B2 | 12/2012 | Bailey et al. | |
| 8,327,429 B2 | 12/2012 | Speyer et al. | |
| 8,336,763 B2 | 12/2012 | Grovit | |
| 8,346,666 B2 | 1/2013 | Lindelsee et al. | |
| 8,352,364 B2 | 1/2013 | Reardon | |
| 8,352,378 B2 | 1/2013 | Al-Herz et al. | |
| 8,380,177 B2 | 2/2013 | Laracey | |
| 8,407,142 B1 | 3/2013 | Griggs | |
| 8,498,940 B2 | 7/2013 | Pelegero et al. | |
| 8,522,039 B2 | 8/2013 | Hyndman et al. | |
| 8,571,937 B2 | 10/2013 | Rose et al. | |
| 8,572,689 B2 | 10/2013 | Radhakrishnan | |
| 8,584,251 B2 | 11/2013 | McGuire et al. | |
| 8,589,271 B2 | 11/2013 | Evans | |
| 8,590,008 B1 | 11/2013 | Ellmore | |
| 8,595,812 B2 | 11/2013 | Bomar et al. | |
| 8,620,790 B2 | 12/2013 | Priebatsch | |
| 8,660,946 B2 | 2/2014 | Driemeyer et al. | |
| 8,682,802 B1 | 3/2014 | Kannanari | |
| 8,712,914 B2 | 4/2014 | Lyons et al. | |
| 8,751,381 B2 | 6/2014 | Musser et al. | |
| 8,777,735 B1 | 7/2014 | Fine et al. | |
| 8,788,333 B2 | 7/2014 | Alba et al. | |
| 8,788,429 B2 | 7/2014 | Tieken | |
| 8,789,162 B2 | 7/2014 | Radhakrishnan | |
| 8,839,383 B2 | 9/2014 | Van Horn | |
| 8,874,467 B2 | 10/2014 | Yahn et al. | |
| 8,943,574 B2 | 1/2015 | Bailey et al. | |
| 8,985,442 B1 | 3/2015 | Zhou et al. | |
| 8,996,423 B2 | 3/2015 | Johnson et al. | |
| 9,055,053 B2 | 6/2015 | Radhakrishnan et al. | |
| 9,069,943 B2 | 6/2015 | Radhakrishnan et al. | |
| 9,767,651 B2 | 9/2017 | Fine et al. | |
| 10,402,897 B1 | 9/2019 | Czyzewski et al. | |
| 2001/0045454 A1 | 11/2001 | Gangi | |
| 2003/0028481 A1 | 2/2003 | Flitcroft et al. | |
| 2003/0061170 A1 | 3/2003 | Uzo | |
| 2003/0163787 A1 | 8/2003 | Hay et al. | |
| 2005/0131874 A1 | 6/2005 | Verbitsky | |
| 2005/0171847 A1 | 8/2005 | Ling | |
| 2006/0249574 A1 | 11/2006 | Brown et al. | |
| 2008/0109319 A1 | 5/2008 | Foss | |
| 2008/0179395 A1 | 7/2008 | Dixon et al. | |
| 2009/0106134 A1* | 4/2009 | Royyuru | G06Q 20/40 705/35 |
| 2009/0119757 A1 | 5/2009 | Acuna et al. | |
| 2009/0158404 A1 | 6/2009 | Hahn et al. | |
| 2009/0164327 A1 | 6/2009 | Bishop et al. | |
| 2010/0241571 A1 | 9/2010 | McDonald | |
| 2010/0268645 A1 | 10/2010 | Martino et al. | |
| 2011/0010277 A1* | 1/2011 | Enzaldo | G06Q 20/04 705/30 |
| 2011/0166992 A1 | 7/2011 | Dessert et al. | |
| 2011/0191209 A1 | 8/2011 | Gould et al. | |
| 2011/0218907 A1 | 9/2011 | Dessert et al. | |
| 2011/0238517 A1* | 9/2011 | Ramalingam | H04W 4/029 705/26.1 |
| 2012/0017089 A1 | 1/2012 | Kocher | |
| 2012/0030047 A1 | 2/2012 | Fuentes et al. | |
| 2012/0197794 A1 | 8/2012 | Grigg et al. | |
| 2012/0203700 A1 | 8/2012 | Ornce et al. | |
| 2012/0316992 A1 | 12/2012 | Oborne | |
| 2012/0317034 A1 | 12/2012 | Guha et al. | |
| 2012/0330846 A1 | 12/2012 | Light et al. | |
| 2013/0036048 A1 | 2/2013 | Campos et al. | |
| 2013/0054336 A1 | 2/2013 | Graylin | |
| 2013/0054454 A1 | 2/2013 | Purves et al. | |
| 2013/0054470 A1 | 2/2013 | Campos et al. | |
| 2013/0060678 A1 | 3/2013 | Oskolkov et al. | |
| 2013/0097047 A1 | 4/2013 | Kim | |
| 2013/0110658 A1 | 5/2013 | Lyman et al. | |
| 2013/0159178 A1 | 6/2013 | Colon et al. | |
| 2013/0191227 A1 | 7/2013 | Pasa et al. | |
| 2013/0204775 A1 | 8/2013 | Midkiff et al. | |
| 2013/0204787 A1 | 8/2013 | Dubois | |
| 2013/0218657 A1 | 8/2013 | Salmon et al. | |
| 2013/0246258 A1 | 9/2013 | Dessert | |
| 2013/0246272 A1* | 9/2013 | Kirsch | G06Q 20/3821 705/44 |
| 2013/0254052 A1 | 9/2013 | Royyuru et al. | |
| 2013/0254115 A1 | 9/2013 | Pasa et al. | |
| 2013/0262315 A1 | 10/2013 | Hruska | |
| 2013/0268437 A1 | 10/2013 | Desai et al. | |
| 2014/0006273 A1 | 1/2014 | Gopinath et al. | |
| 2014/0012647 A1 | 1/2014 | Hecht | |
| 2014/0032419 A1 | 1/2014 | Anderson et al. | |
| 2014/0130035 A1 | 5/2014 | Desai et al. | |
| 2014/0188719 A1 | 7/2014 | Poornachandran et al. | |
| 2014/0214640 A1 | 7/2014 | Mallikarjunan et al. | |
| 2014/0279554 A1 | 9/2014 | Priebatsch et al. | |
| 2014/0279566 A1 | 9/2014 | Verma et al. | |
| 2014/0330721 A1 | 11/2014 | Wang | |
| 2015/0019439 A1 | 1/2015 | Phillips | |
| 2015/0026072 A1 | 1/2015 | Zhou et al. | |
| 2015/0032627 A1 | 1/2015 | Dill et al. | |
| 2015/0081557 A1 | 3/2015 | Kinfoil et al. | |
| 2015/0081567 A1 | 3/2015 | Boyle et al. | |
| 2015/0100495 A1 | 4/2015 | Salama et al. | |
| 2015/0120569 A1 | 4/2015 | Belshe et al. | |
| 2015/0199689 A1 | 7/2015 | Kumnick et al. | |
| 2015/0206137 A1 | 7/2015 | Mazarim Fernandes | |
| 2015/0213443 A1 | 7/2015 | Geffon et al. | |
| 2015/0254647 A1 | 9/2015 | Bondesen et al. | |
| 2015/0254648 A1 | 9/2015 | Clements et al. | |
| 2015/0254653 A1 | 9/2015 | Bondesen et al. | |
| 2015/0254663 A1 | 9/2015 | Bondesen et al. | |
| 2015/0254664 A1 | 9/2015 | Bondesen et al. | |
| 2015/0254770 A1 | 9/2015 | Bondesen et al. | |
| 2015/0286995 A1 | 10/2015 | Korosec | |
| 2016/0050203 A1* | 2/2016 | Hefetz | H04L 63/18 726/7 |
| 2016/0055481 A1 | 2/2016 | Ellis et al. | |
| 2016/0140542 A1 | 5/2016 | Hammad | |
| 2016/0337390 A1 | 11/2016 | Sridhara et al. | |
| 2017/0046665 A1 | 2/2017 | Sheehan et al. | |
| 2018/0056179 A1 | 3/2018 | Rose et al. | |

FOREIGN PATENT DOCUMENTS

| | | |
|---|---|---|
| WO | 2013095486 A1 | 6/2013 |
| WO | 2016088087 A1 | 6/2016 |

OTHER PUBLICATIONS

White, R., How Computers Work, Oct. 15, 2003, 7th edition, Que Publishing, Indianapolis, IN, 23 pages.

Mobile Payments in the United States Mapping Out the Road Ahead, Darin Contini, Mar. 25, 2011 (Year: 2011).

Giannakoudi, "Internet Banking: The Digital Voyage of Banking and Money in CyberSpace", Information & Communications Technology Law, vol. 8, No. 3, 1999, University of Kent, Canterbury, UK.. (Year: 1999).

Ahamed, "A novel view on Electronic Cash and Electronic payment schemes : A comprehensive study", GESJ: Computer Science and

(56) References Cited

OTHER PUBLICATIONS

Telecommunications 2010INo. 3(26), Princicpal, Sathak Institute of Technology, Ramanathapuram, Tamilnadu,India. (Year: 2010).

* cited by examiner

NON-INTRUSIVE GEO-LOCATION DETERMINATION ASSOCIATED WITH TRANSACTION AUTHORIZATION

CROSS-REFERENCE TO PRIORITY APPLICATION

This application is a continuation of and claims the benefit of U.S. Non-Provisional patent application Ser. No. 14/871,964 entitled "Non-Intrusive Geo-Location determination associated with Transaction Authorization" filed on Sep. 30, 2015, which published on Mar. 30, 2017, as U.S. Patent Application Publication No. 2017/0091764, each of which is hereby incorporated by reference in its entirety.

BACKGROUND

In the new technological era, authenticating transactions, determining authorization of the customers and/or the merchants involved in the transactions and determining validity of transactions, while maintaining the security of personal and financial information is an important concern. As a result, several business industries, such as financial institutions, have taken precautionary measures to ensure the safety and protection of their customers' financial information. A recent development is tokenization of accounts, whereby one or more secure tokens or payment credentials are assigned to an account and represent the account in transactions. These transactions may be authenticated and/or validated based on, at least in part, determined locations of the customers relative to the locations of the transactions, as disclosed in the present invention. In this regard, perpetual monitoring of the customers' locations may not be feasible both due to the myriad of transactions and the necessity to preserve the security of personal information of customers. Therefore, there is a need for systems directed to non-intrusive location determination for authentication and/or authorization of transactions that preclude any inadvertent privacy concerns.

The previous discussion of the background to the invention is provided for illustrative purposes only and is not an acknowledgement or admission that any of the material referred to is or was part of the common general knowledge as at the priority date of the application.

BRIEF SUMMARY

Some embodiments of the invention are directed to systems, apparatuses, methods and computer program products for non-intrusive geo location determination for transaction authorization, whereby the system enables authorization of a transaction associated with a user, based on at least determining the congruence of a user location and a transaction location while maintaining the privacy of the user's location information. In some embodiments the apparatuses and systems comprise at least one memory; at least one processor; and a module stored in the memory, executable by the at least one processor, and configured to cause the at least one processor to: receive transaction information regarding at least one transaction associated with a user; determine a transaction location associated with the at least one transaction based on analyzing the transaction information, wherein determining the transaction location associated with the at least one transaction further comprises determining a transaction date and a transaction time associated with the at least one transaction; determine at least one user device associated with the user; formulate one or more queries related to the at least one transaction such that the one or more queries can be answered in the affirmative or in the negative, wherein the one or more queries are associated with the determined transaction location; transmit a request to the at least one user device to determine a user location, wherein the request comprises the one or more queries; receive a response from the at least one user device, wherein the response comprises answers to the one or more queries in the affirmative or in the negative; and determine the validity of the at least one transaction based on at least determining that the user location is the same as the transaction location.

In some embodiments, receiving transaction information regarding the at least one transaction associated with the user is an indication that the user seeks to initiate the at least one transaction, wherein: the user location is the current location of the user; and determining the validity of the at least one transaction further comprises authorizing the at least one transaction and enabling the at least one transaction to be completed in real time.

In some embodiments, the transaction information regarding the at least one transaction associated with the user is received after the completion of the at least one transaction and prior to the settlement of the at least one transaction at a predetermined future settlement date, wherein: the transaction information comprises a transaction history associated with the user; the user location is a location of the user at the transaction date and the transaction time associated with the at least one transaction; and determining the validity of the at least one transaction further comprises authorizing the at least one transaction to be settled and posted at the predetermined future settlement date.

In some embodiments, the system is further configured to initiate installation of a non-intrusive geo location determination application on the at least one user device, wherein the application restricts access to location information of the at least one user device and wherein the application initiates storing of the location information in an isolated memory location or on a secure element of the user device.

In some embodiments, the system is further configured to: transform the request by encoding the one or more queries, wherein the application is configured to decode the transformed request and provide an encoded response comprising answers to the one or more queries in the affirmative or in the negative; and receive the encoded response from the at least one user device and decode the response to determine whether the user location is the same as the transaction location.

In some embodiments, the system is further configured to receive one or more parameters associated with the one or more queries from the user, wherein the one or more parameters comprise precision of location information in the one or more queries, number of queries and a time frame for receiving the one or more queries.

In some embodiments, the at least one transaction comprises a plurality of transactions, wherein the system is further configured to initiate a display of a map on the at least one user device, wherein the map is augmented with a route comprising transaction locations associated with each of the plurality of transactions based on determining the validity of the plurality of transactions.

Some embodiments of the invention are directed to systems, apparatuses, methods and computer program products for non-intrusive geo location determination for transaction authorization, whereby the system enables automatic and real time utilization of one or more payment credentials applicable for a transaction initiated by the user, the apparatus comprising: at least one memory; at least one processor; and a module stored in the memory, executable by the at least one processor, and configured to cause the at least one processor to: establish an operative communication link between a point of sale terminal associated with a merchant and a user device comprising a mobile wallet application; receive an indication that a user has initiated a transaction; retrieve transaction information associated with the initiated transaction, wherein the transaction information comprises one or more transaction parameters, the one or more transaction parameters comprising a geographic location and a transaction amount; determine one or more payment credentials applicable to process the transaction based on analyzing at least the transaction information, the one or more payment credentials being associated with the user, wherein each of the one or more payment credentials are associated with at least one correlated transaction parameter of the one or more transaction parameters; initiate, automatically, a presentation of a graphical user interface for display on the user device, wherein the graphical user interface comprises the one or more payment credentials applicable to process the transaction; receive via the graphical user interface, a user selection of at least one payment credential from the one or more payment credentials determined to be applicable to process the transaction; and transmit via the established link, the at least one payment credential to the point of sale terminal; wherein, the transmitted at least one payment credential is configured to enable an external system to process the transaction based on the at least one correlated transaction parameter.

In some embodiments, the at least one correlated transaction parameter is the transaction amount, wherein determining the one or more payment credentials applicable to process the transaction comprises: determining a plurality of payment credentials associated with the user, wherein each of the plurality of payment credentials are associated with one or more transaction amount parameters, the one or more transaction amount parameters comprising a maximum transaction amount; and determining the one or more payment credentials of the plurality of payment credentials, based on determining that the one or more transaction amount parameters associated with each of the one or more payment credentials are applicable for the transaction amount of the transaction; wherein the each of the one or more payment credentials are configured to enable the external system to process the transaction in accordance with the transaction amount.

In some embodiments, the one or more transaction amount parameters further comprise a time period associated with the transaction amount, frequency of use during the time period and minimum threshold balance.

In some embodiments, the at least one correlated transaction parameter is the geographic location, wherein determining the one or more payment credentials applicable to process the transaction comprises: determining a plurality of payment credentials associated with the user, wherein each of the plurality of payment credentials are associated with a geographic area; and determining the one or more payment credentials of the plurality of payment credentials, based on determining that the geographic location of the transaction is within the geographic area associated with each of the one or more payment credentials; wherein the each of the one or more payment credentials are configured to enable the external system to process the transaction in accordance with the geographic location.

In some embodiments, the one or more payment credentials comprise one or more characteristics, the one or more characteristics comprising currency exchange rate, loyalty points, processing time and purchase offers.

In some embodiments, the system is further configured to: determine a method of authentication associated with the transaction, wherein the method of authentication comprises one or more authentication credentials provided by the user at the user device, wherein determining the method of authentication further comprises: requesting the one or more authentication credentials from the user via the graphical user interface of the user device; and receiving, the one or more authentication credentials from the user; and determine a level of user authorization associated with the method of authentication.

In some embodiments, the at least one correlated transaction parameter is a level of user authorization, wherein determining the one or more payment credentials applicable to process the transaction comprises: determining a plurality of payment credentials associated with the user, wherein each of the plurality of payment credentials are associated with a credential authorization level; and determining the one or more payment credentials of the plurality of payment credentials, based on determining that the level of user authorization matches the credential authorization level; wherein the each of the one or more payment credentials are configured to enable the external system to process the transaction in accordance with the level of user authorization.

BRIEF DESCRIPTION OF THE DRAWINGS

Figure 1:
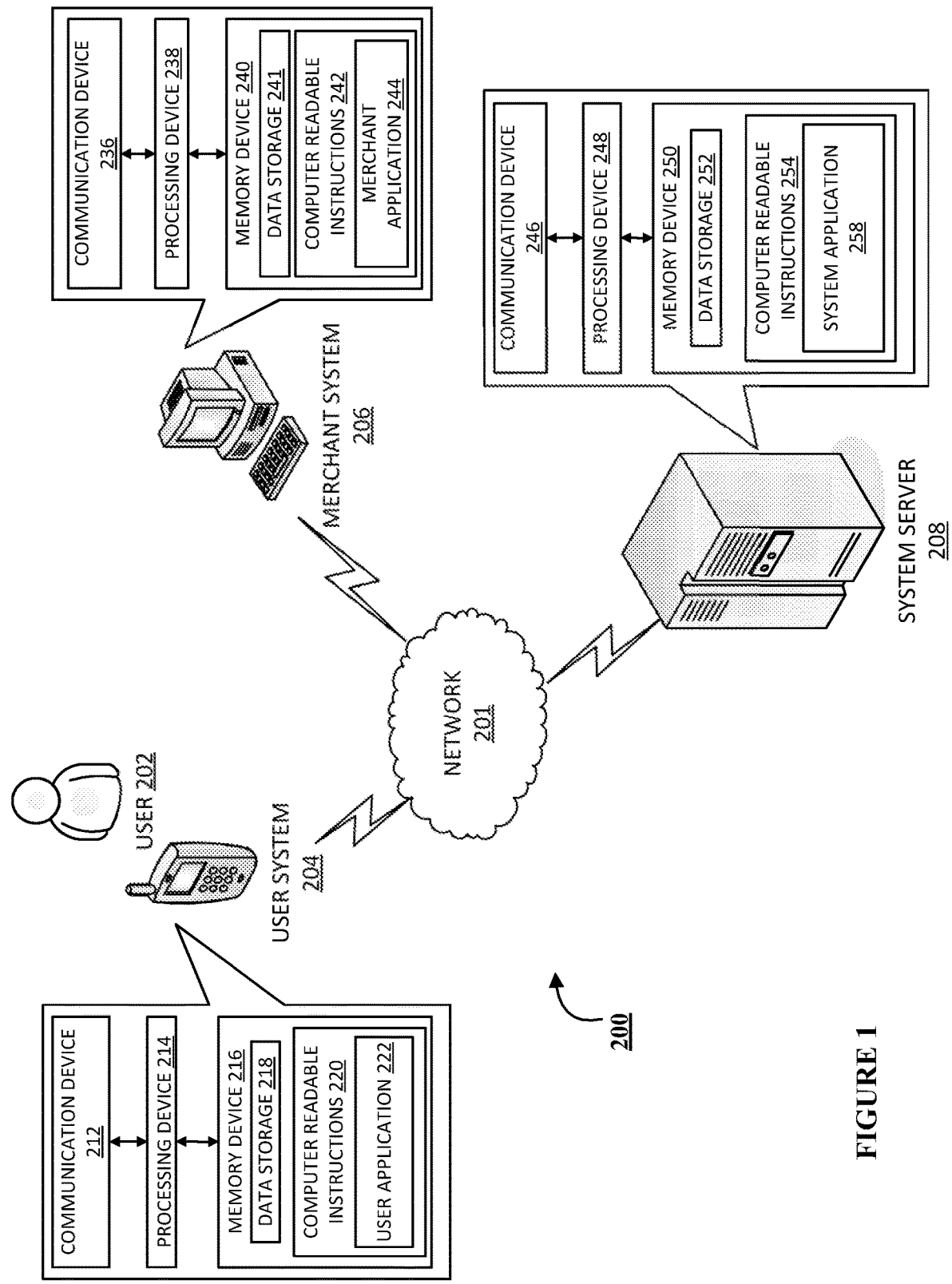
Figure 2:
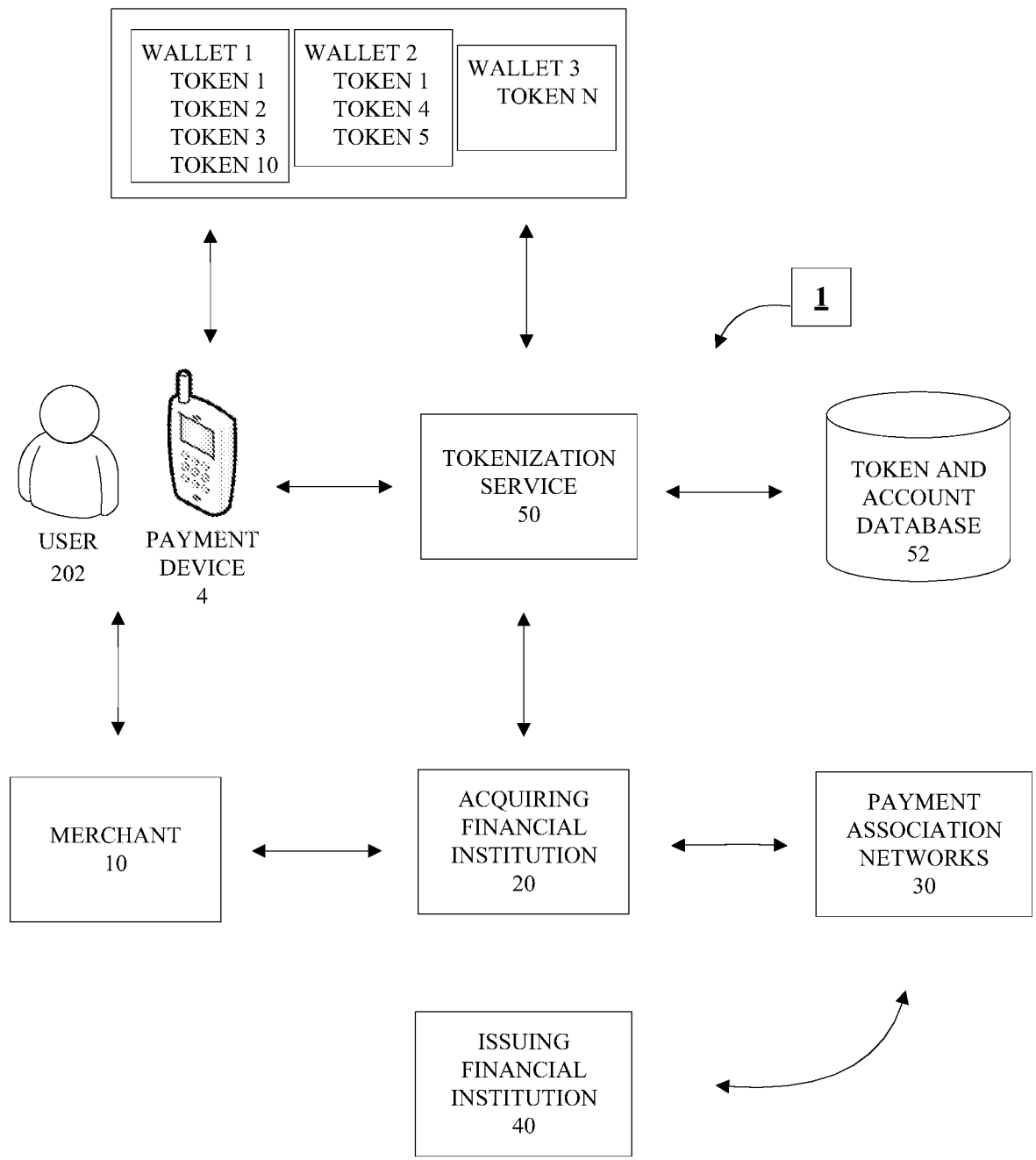
Figure 3:
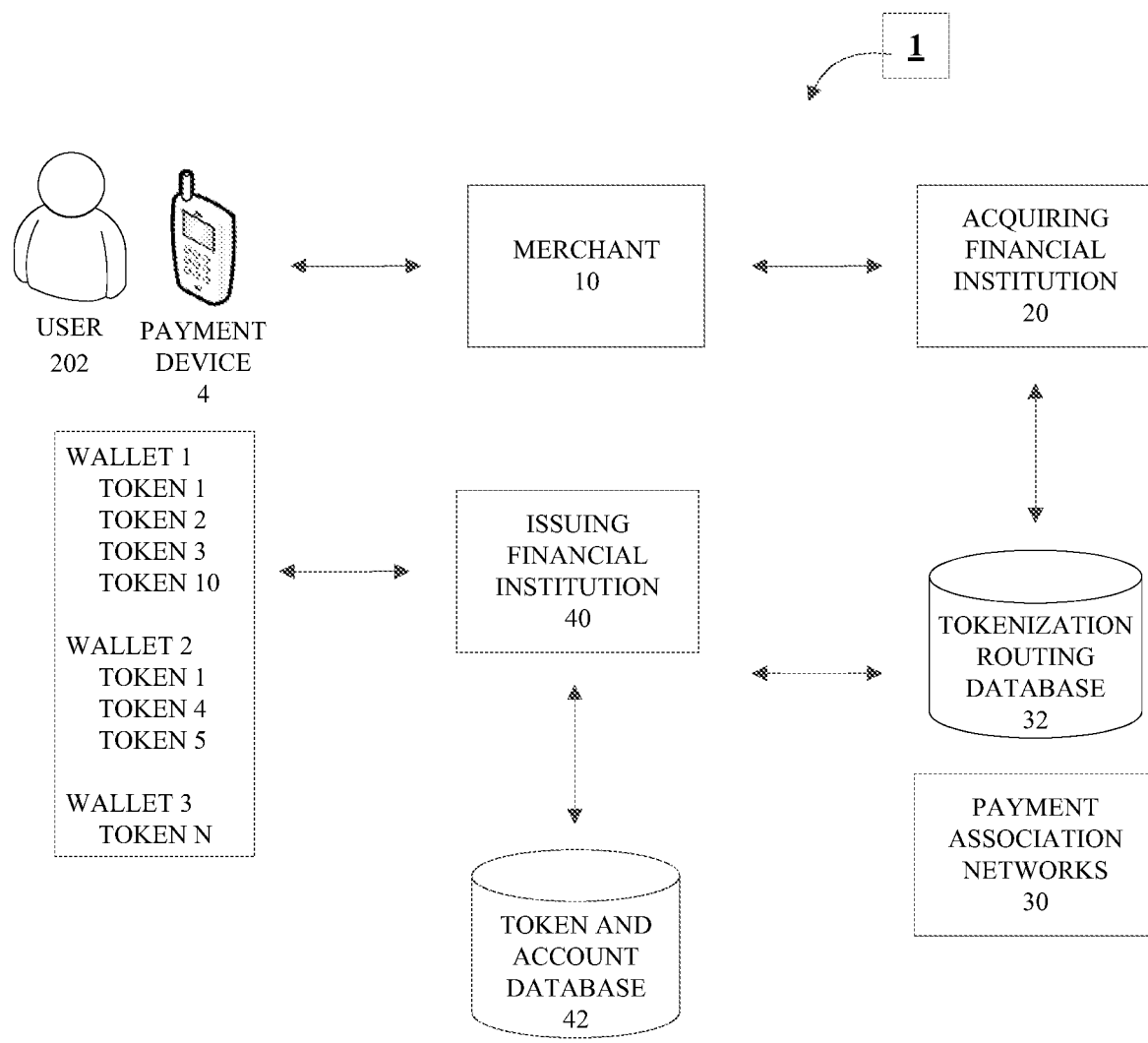
Figure 4:
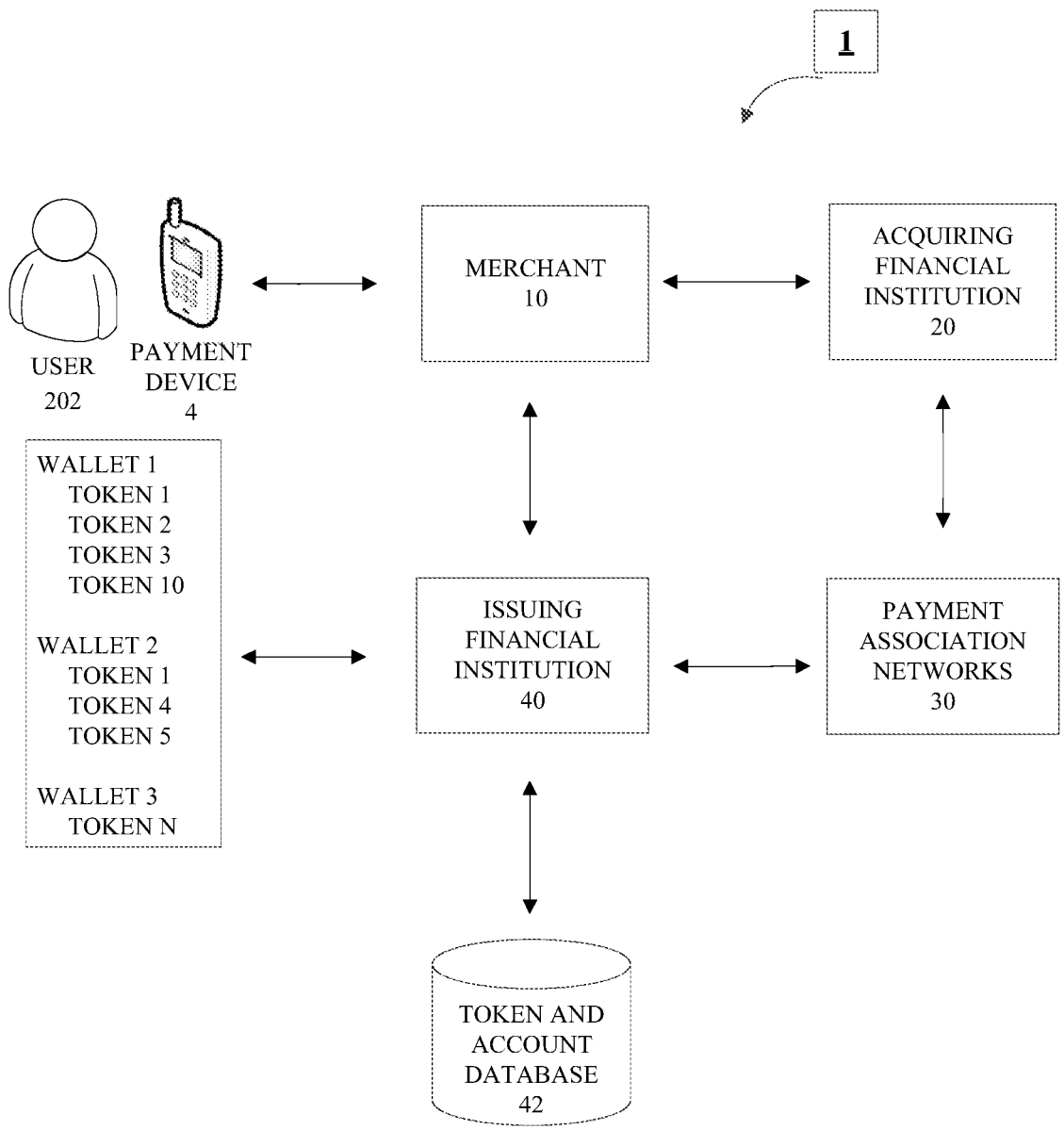
Figure 5:
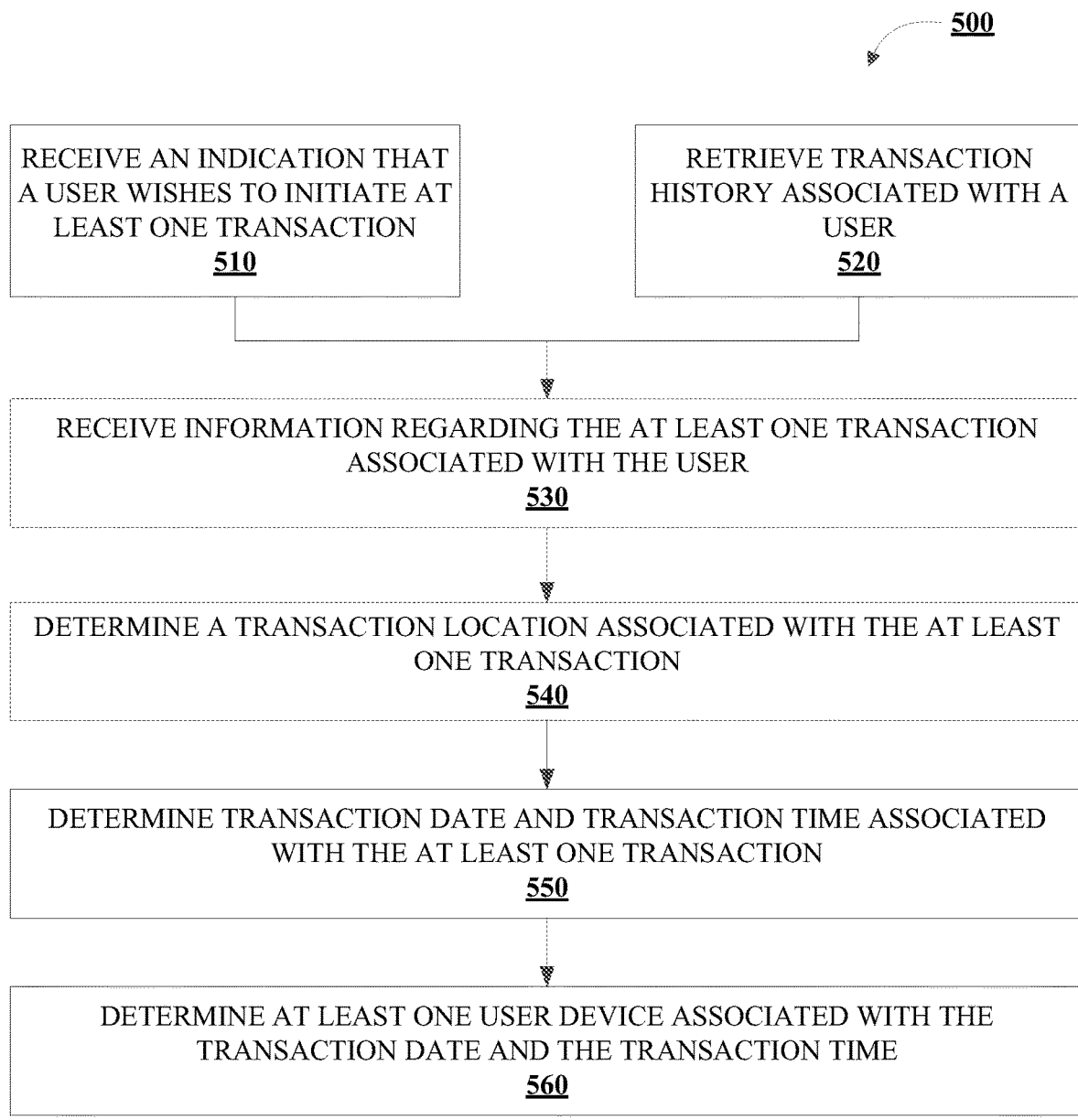
Figure 6:
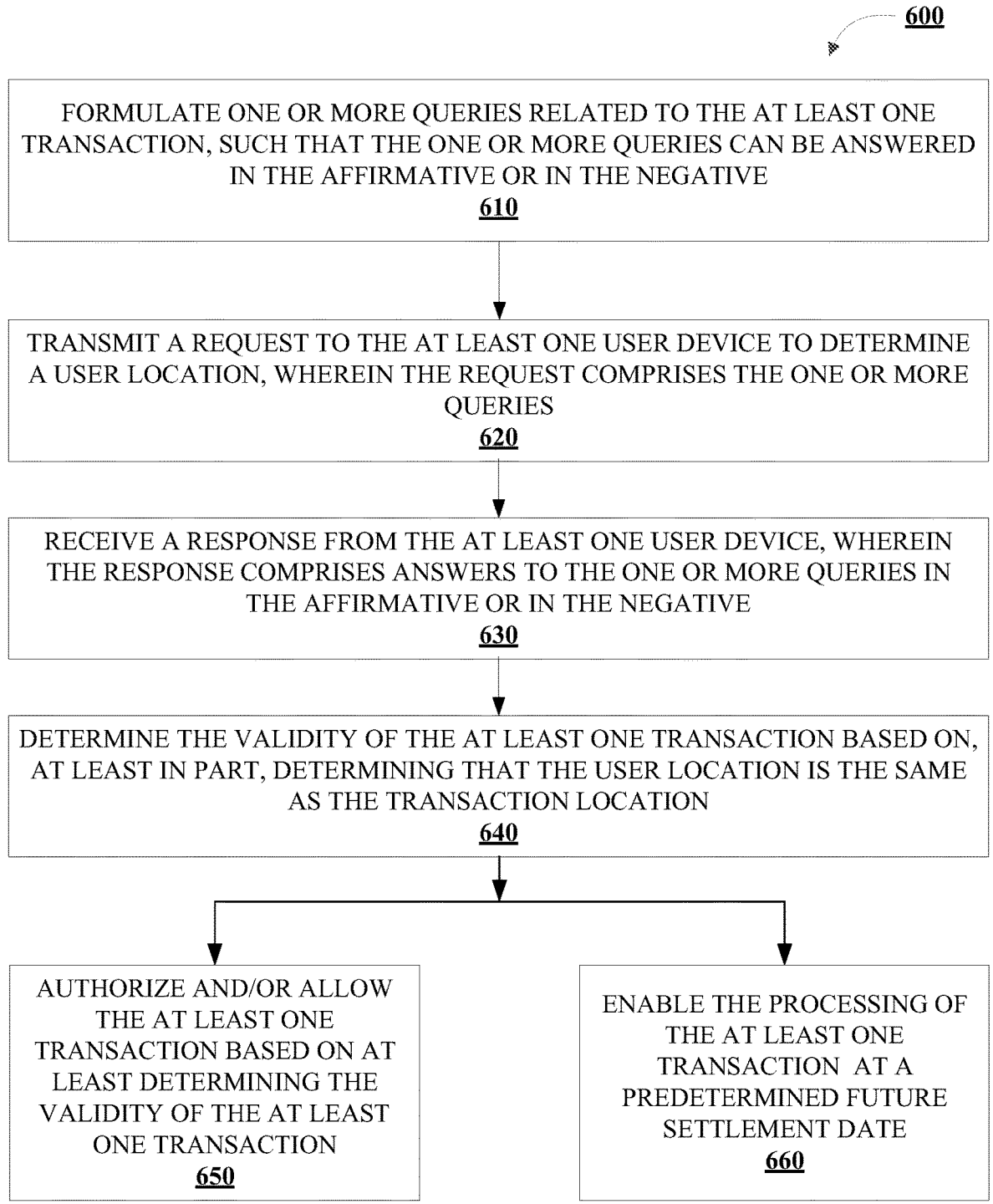
Figure 7:
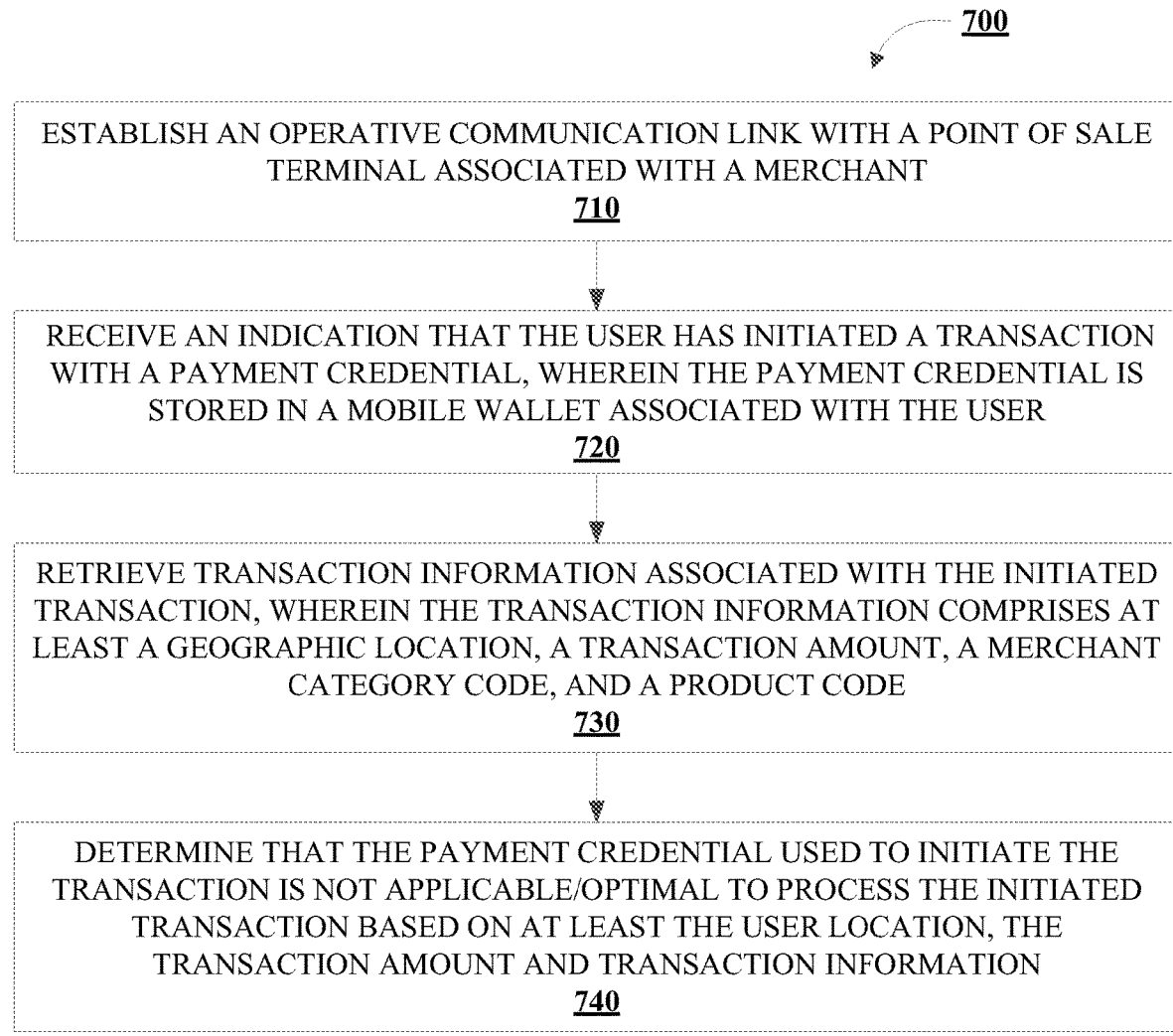
Figure 8:
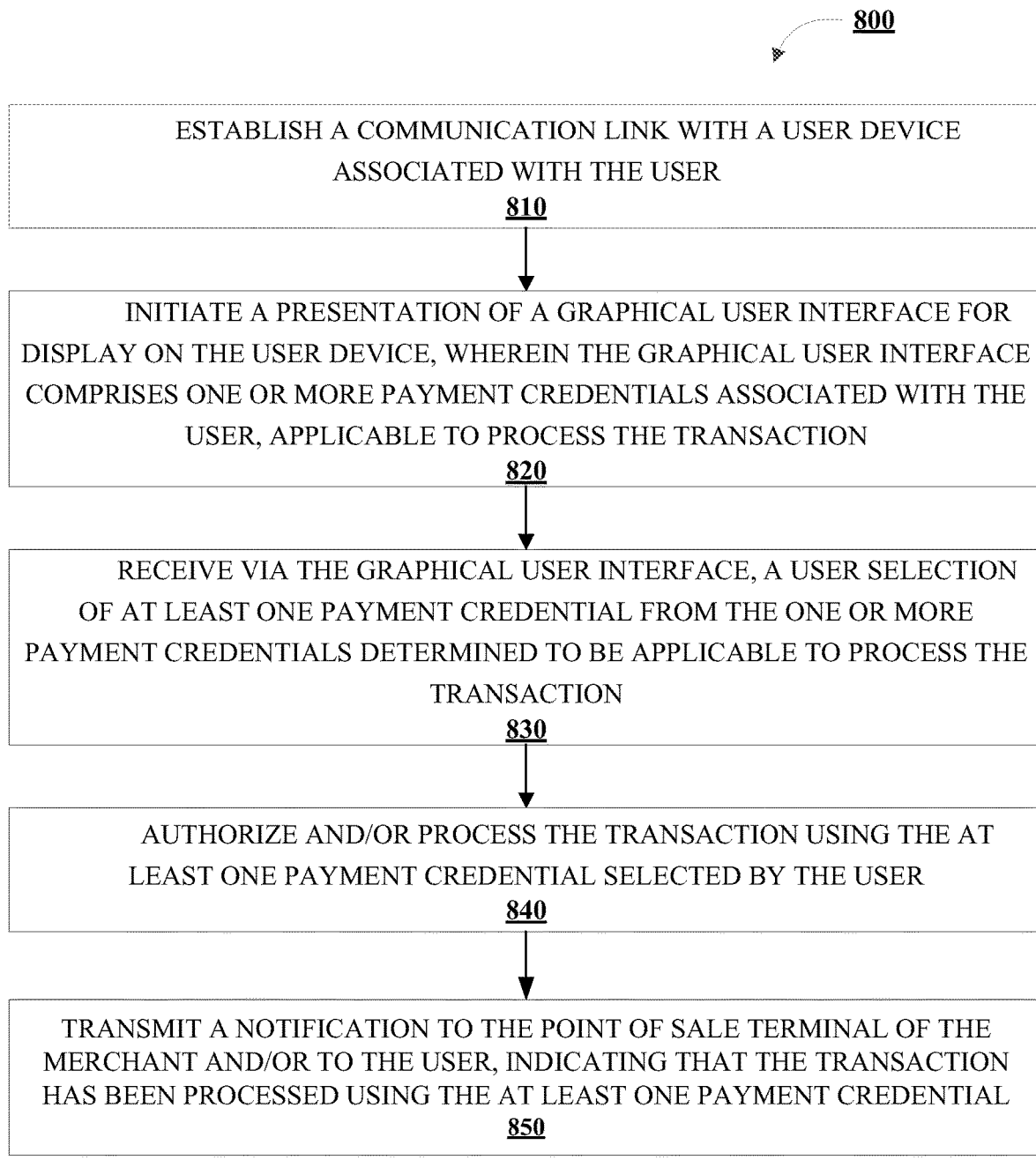
Figure 9:
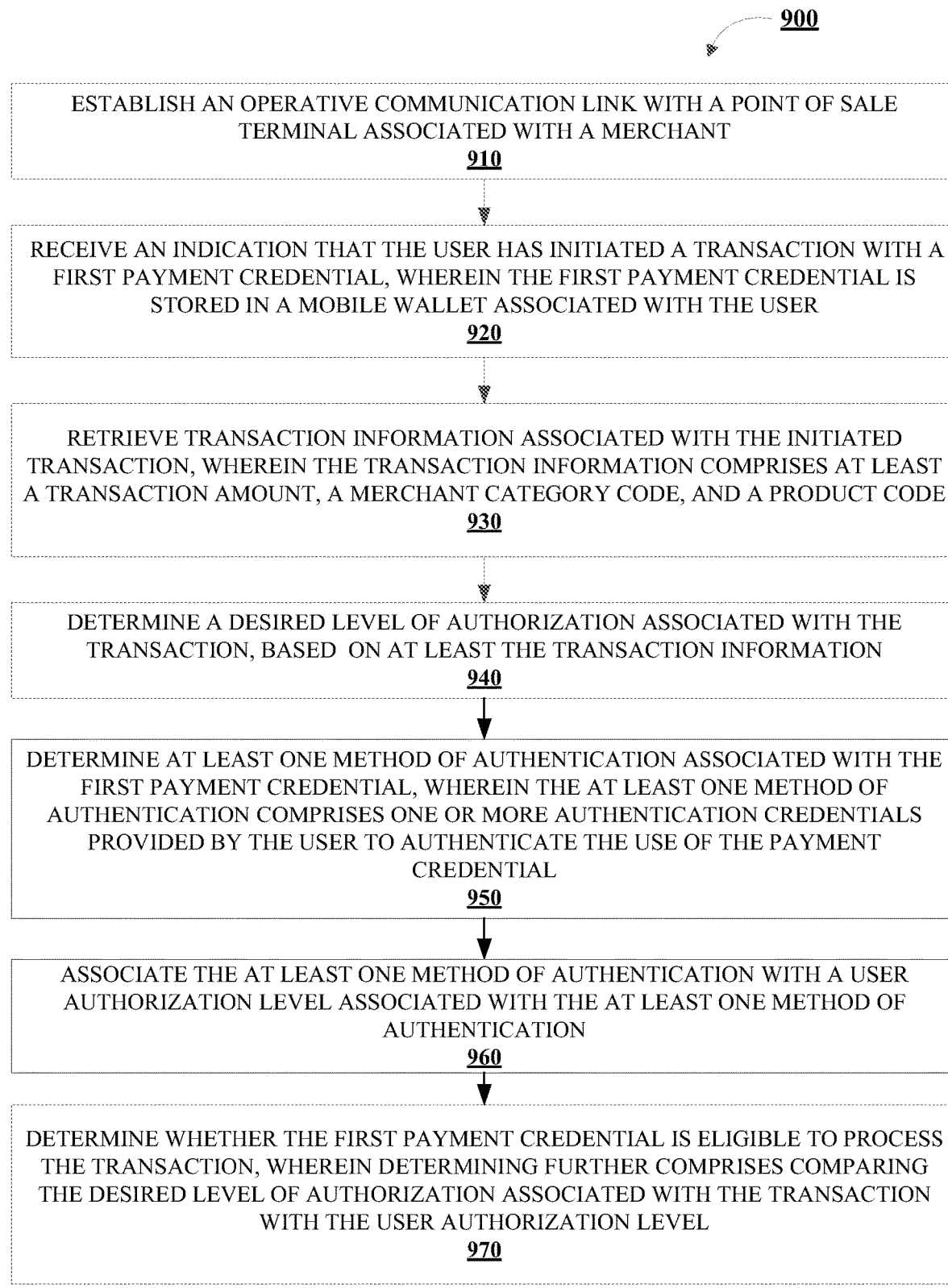
Figure 10:
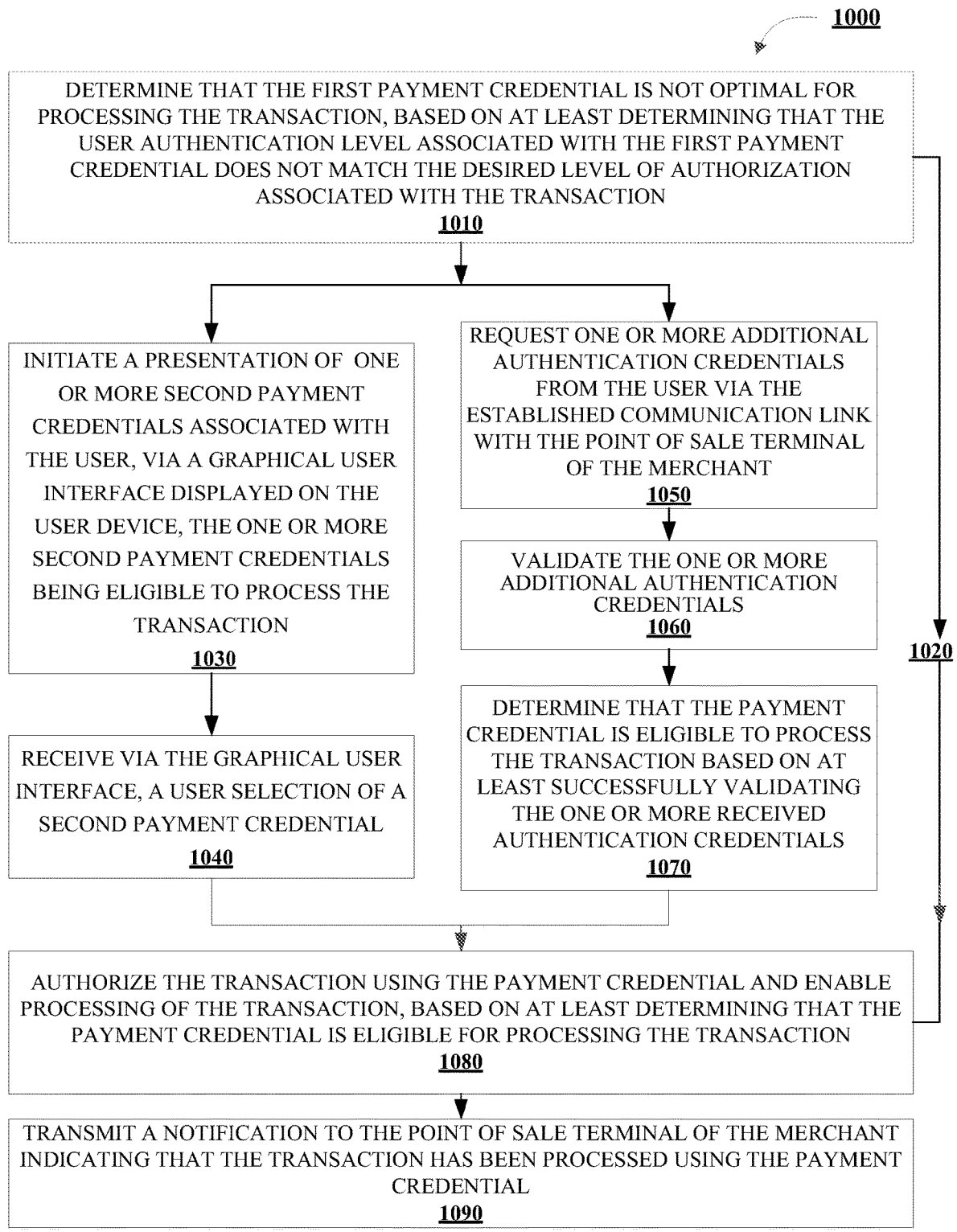

Having thus described embodiments of the invention in general terms, reference will now be made to the accompanying drawings, where:

FIG. 1 is a diagram illustrating an environment in which systems according to embodiments of the invention operate;

FIG. 2 is a diagram illustrating a token system, in accordance with embodiments of the present invention;

FIG. 3 is a diagram illustrating a token system, in accordance with embodiments of the present invention;

FIG. 4 is a diagram illustrating a token system, in accordance with embodiments of the present invention;

FIG. 5 is a high level process flow illustrating non-intrusive geo-location determination associated with transaction authorization according to some embodiments of the invention;

FIG. 6 is a high level process flow illustrating non-intrusive geo-location determination associated with transaction authorization according to some embodiments of the invention;

FIG. 7 is a high level process flow for transaction authorization based on user location and/or the transaction amount in accordance with some embodiments of the invention;

FIG. 8 is a high level process flow for transaction authorization based on user location and/or the transaction amount in accordance with some embodiments of the invention;

FIG. 9 is a high level process flow for transaction authorization based on user authentication in accordance with some embodiments of the invention; and FIG. 10 a high level process flow for transaction authorization based on user authentication in accordance with some embodiments of the invention.

Figure 11:
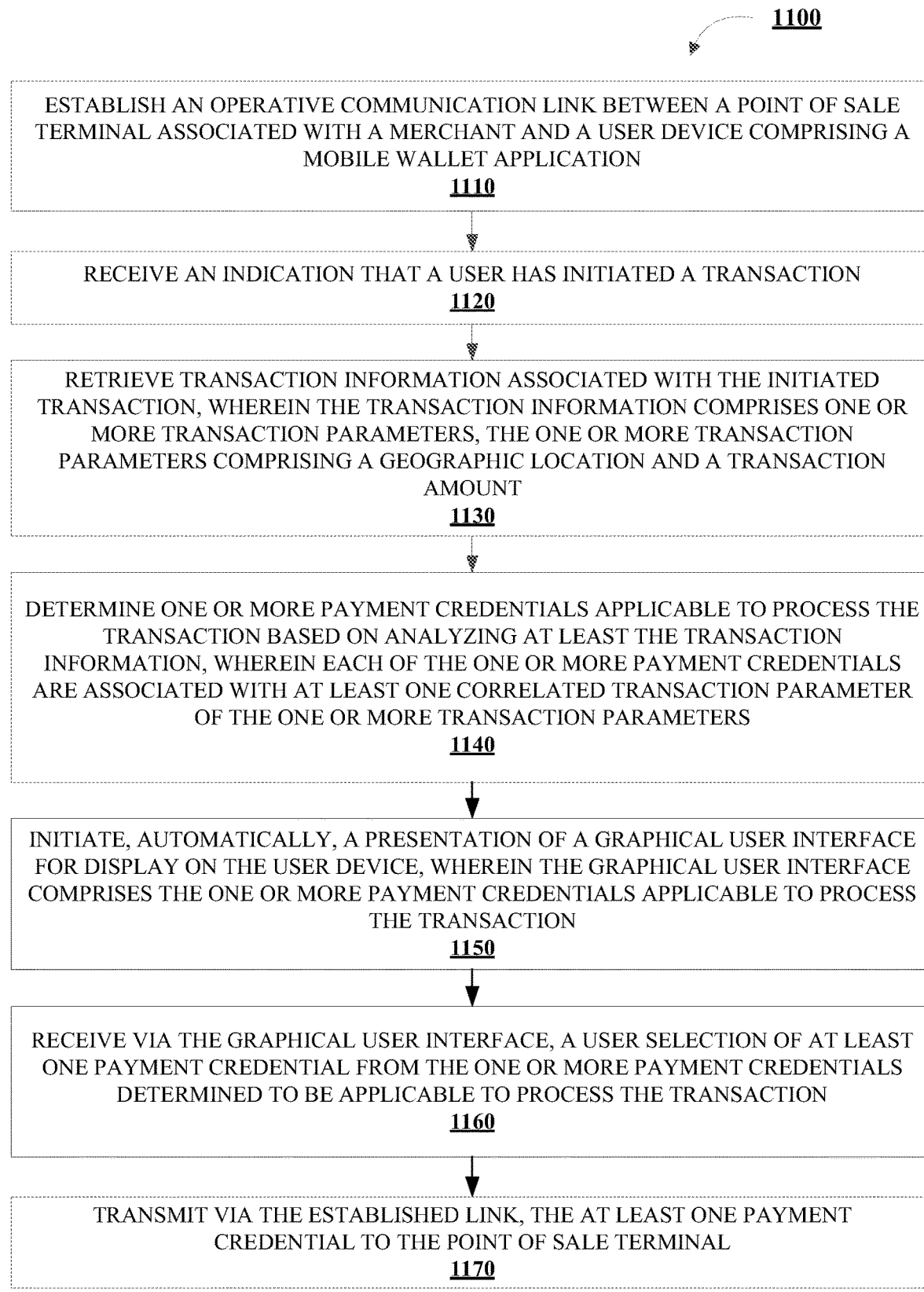

FIG. 11 a high level process flow for payment credential utilization in accordance with some embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, as used herein the invention creates an infrastructure for routing payments and completing payment processing via token presentation at a merchant. The infrastructure may be referred to as a payment infrastructure, token infrastructure, and/or internal infrastructure, that is created for the recognition and processing of tokens to complete a transaction with a merchant that may not have the infrastructure capabilities to complete and process a transaction using a token.

In accordance with embodiments of the invention, the term "financial transaction" or "transaction" refers to any transaction involving directly or indirectly the movement of monetary funds through traditional paper transaction processing systems (i.e. paper check processing) or through electronic transaction processing systems. Typical financial transactions include point of sale (POS) transactions, automated teller machine (ATM) transactions, internet transactions, online shopping, electronic funds transfers (EFT) between accounts, transactions with a financial institution teller, personal checks, etc. When discussing that transactions are evaluated it could mean that the transaction is yet to be executed, or the transaction has already occurred, is in the process of occurring or being processed, or it has yet to be processed by one or more financial institutions. In some embodiments of the invention, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments and the like.

An "entity" as used herein may be a financial institution. In accordance with embodiments of the invention, the term "financial institution" refers to any organization in the business of providing financial services, transferring, investing, or lending money, dealing in financial instruments, or services that involve monetary transactions. This includes commercial banks, thrifts, federal and state savings banks, savings and loan associations, credit unions, investment companies, merchants, insurance companies and the like. In some embodiments, the entity may allow a user to establish an account with the entity. An "account" may be the relationship that the user has with the entity. Examples of accounts include a deposit account, such as a transactional account (e.g. a banking account), a savings account, an investment account, a money market account, a time deposit, a demand deposit, a pre-paid account, a credit account, or the like. The account is associated with and/or maintained by an entity. In some embodiments, the entity may provide one or more financial instruments to the user for executing financial transactions. In some embodiments, the financial instruments like credit cards, debit cards, checks, account identifiers, routing numbers, passcodes and the like are associated with one or more accounts of the user. In other embodiments, an "entity" may not be a financial institution. In some embodiments, an entity may be any institution, group, association, club, establishment, company, union, authority or the like with which a user may have a relationship. In some embodiments, the entity represents a vendor or a merchant with whom the user engages in financial (for example: purchases, payments, returns, enrolling in merchant accounts and the like) or non-financial transactions (for example: loyalty programs and the like), either online or in physical stores.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer). In some embodiments, the direct customer may provide one or more financial instruments associated with the direct customer to one or more indirect customers or entities for the purpose of executing transactions.

Various embodiments of the present invention relate to tokenization, which is generally described in the area of financial transactions as utilizing a "token" (e.g., an alias, substitute, surrogate, or other like token identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the interne instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased. In some embodiments, tokens may be used in lieu of or in combination with other conventionally used payment instruments like checks, credit cards, debit cards, account identifiers like account numbers, routing numbers, credit card numbers, CVV numbers, personal identification numbers and the like.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like). In some embodiments, the tokens may vary depending on the type of account information being tokenized. For example, tokens directed to a user account may comprise two or more parts, each reflecting an account identifier like account number and routing number. Tokens directed to a credit card may comprise a single part reflecting the credit card number or may comprise multiple parts also reflecting other card details like CVV number and the expiration date in addition to the credit card number. In some embodiments, the tokens are device-specific and are unique to a particular device of the user and may comprise at least a portion of the device identifier of the user device. For example, the user may have multiple tokens directed to a single account stored on/used with one or more devices. The tokens used with/stored in each of the one or more devices may be distinct and device specific, even though the tokens are associated with the same user account.

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token (e.g., provide a link or information that directs a system to a location of a token), in order to represent the specific account number during a transaction. In other embodiments of the invention, the digital wallet may store some or all of the user account information (e.g., account number, user name, pin number, or the like), including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. In some embodiments, when the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus, how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiments, this may be the merchant or another third party that stores the token), and the transaction may be processed accordingly.

Specific tokens, in some embodiments, may be tied to a single user account, but in other embodiments, may be tied to multiple user accounts, as will be described throughout this application. In some embodiments, a single token could represent multiple accounts, such that when entering into a transaction the user may select the token (or digital wallet associated with the token) and select one of the one or more accounts associated with the token in order to allocate the transaction to a specific account. In still other embodiments, after selection of the token by the user the system may determine the best account associated with the token to use during the transaction (e.g., most cash back, most rewards points, best discount, prior usage or the like). In addition, the tokens may be associated with a specific digital wallet or multiple digital wallets as desired by the institutions or users.

Moreover, the tokens themselves, or the user accounts, individual users, digital wallets, or the like associated with the tokens, may have limitations that limit the transactions that the users may enter into using the tokens. The limitations may include, limiting the transactions of the user to a single merchant, a group of multiple merchants, merchant categories, single products, a group a products, product categories, transaction amounts, transaction numbers, geographic locations, time limits or other like limits, either alone or in combination, as is described herein.

Presenting a credit card on a digital wallet may provide a visual bank or credit card to the user. As referred to herein, the visual bank or credit card may refer to, but is not limited to, an electronic or digital transaction vehicle or a physical vehicle that can be used to transfer money, make a payment (for a service or a good), withdraw money, and similar or related transactions. Using an approved/authorized banking channel of communication, which may include making a phone call, accessing online banking, walking into a branch banking center, using an automatic teller machine or a point of sale device, or the like, a user may indicate that an existing physical transaction card associated with one or more financial accounts of the user is misplaced, lost, or has been misappropriated.

Building an alternate payments ecosystem utilizing tokenization requires a number of entities working together in order to deliver alternative, such as near field communication (NFC) or other technology based payment services to the end users. One of the issues is the interoperability between the players and to resolve this issue the role of trusted service manager (TSM) is proposed to establish a technical link between a user device and providers of services, so that these entities can work together. Tokenization can play a role in mediating such services.

Tokenization as a security strategy lies in the ability to replace a real card number with a token number and the subsequent limitations placed on the token number. If the token number can be used in an unlimited fashion or even in a broadly applicable manner, the token value gains as much value as the real credit card number. In these cases, the token may be secured by a second dynamic token that is unique for each transaction and also associated to a specific payment card. Examples of dynamic, transaction-specific tokens include cryptograms used in the EMV specification, and DDM mobile payment transactions.

Merchants do not always have the intricate and detailed infrastructure necessary to receive a token and process that token as a payment device or payment account for a transaction. As such, the invention provides a migration system for token processing for merchants.

Embodiments of the invention are directed to systems, methods, or computer program products for non-intrusive geo-location determination associated with transaction authorization. When a user initiates a transaction with a merchant using one or more payment instruments, either online or in a physical store, authentication of the transaction is crucial for processing and/or settlement of the transaction. This authentication may comprise, in one form or another, authenticating the user and/or the merchant involved, authenticating the payment instrument, determining authorization of the user and/or the merchant, determining validity of transaction and the like, either in real-time (or near real time) or at a predetermined settlement date. This authentication may be accomplished, at least in part, based on determining the location of the user with a certain precision. For example, the location of a user device may be determined and compared to the location of the merchant associated with the transaction. The location of the user may be determined continuously and user location history may be generated. For instance, the location of the user device may be determined by retrieving global positioning data from a user device, by analyzing audio-visual data received from the user device, by utilizing beacons and other transmitter devices, by analyzing social media feeds and online posts of the user or by other methods known in the art. While these intrusive methods may help determine the user's location with varying levels of accuracy, they may also inadvertently raise concerns about privacy of the user's personal information, specifically the information associated with the user's current location and location history. Embodiments of the present invention eliminate any privacy issues by authenticating the user without requiring the actual location coordinates of the user or the user device and without monitoring and tracking the user location by GPS and other intrusive means. In this regard, in some embodiments, the user may be authenticated, based at least in part, on the user location relative to a landmark location, for example, the location of the associated merchant, without requiring additional infrastructure for location determination such as transmitter devices at the landmark location. Some embodiments of the invention are also directed to determining optimal tokens based on the user location. Some embodiments of the invention are directed to determining optimal tokens based on the type of user authentication.

FIG. 1 illustrates a system environment 200 for non-intrusive geo-location determination associated with transaction authorization, in accordance with some embodiments of the present invention. FIG. 1 provides the system environment 200 for which the distributive network system with specialized data feeds associated with the distributive network with specialized data feeds associated with the distributive network, specific triggering events associated with the data feeds, and data transformation throughout the data feeds to allow for a merchant to have non-infrastructural changes but still allow for tokenization migration and acceptance. FIG. 1 provides a unique system that includes specialized servers and system communicably linked across a distributive network of nodes required to generate uniquely coded tokens and allow those tokens to be stored on a user system 204, on a cloud or other external servers and systems, utilized in a transaction with a merchant system 206, and to be pulled and processed for payment via the system server 208 without infrastructural implementations to the merchant system 206. In some embodiments, the merchant system 206 may be a point of sale terminal, an automated teller machine (ATM) or a system/device used to perform transactions. The system, with its communicably linked diffusible network may, in some embodiments, improve a computing device if utilized thereon by improving the ability for the computer device to read and route tokens for transactions that are incompatible with a computer device based on a lack of infrastructural changes to the device.

The network 201 may be a system specific distributive network receiving and distributing specific network feeds and identifying specific network associated triggers. The network 201 may also be a global area network (GAN), such as the Internet, a wide area network (WAN), a local area network (LAN), a telecommunication network, Near Field Communication network or any other type of network or combination of networks. The network 201 may provide for wireline, wireless, or a combination wireline and wireless communication between devices on the network 201. In some embodiments, the user 202 is an individual who maintains cellular products with one or more providers.

In some embodiments, the user 202 is an individual consumer that is transacting with a merchant. Furthermore, the user 202 is one or more individuals that may have an online banking presents and/or a digital wallet. The user 202 may make one or more transactions to purchase a product with a credit card via a digital wallet. In some embodiments, the purchase may be made by the user 202 using a user system 204.

FIG. 1 also illustrates a user system 204. The user system 204 generally comprises a communication device 212, a processing device 214, and a memory device 216. The user system 204 is a computing system that allows a user 202 to interact with the financial institution to generate a digital or mobile wallet, access online banking applications, and utilize a digital wallet for transaction completion at a merchant. The processing device 214 is operatively coupled to the communication device 212 and the memory device 216. The processing device 214 uses the communication device 212 to communicate with the network 201 and other devices on the network 201, such as, but not limited to the merchant system 206, the system server 208 and other third party systems and databases. In some embodiments, the processing device 214 may send or receive data from the user system 204, to the system server 208 via the communication device 212 over a network 201. As such, the communication device 212 generally comprises a modem, server, or other device for communicating with other devices on the network 201.

The user system 204 comprises computer-readable instructions 220 and data storage 218 stored in the memory device 216, which in some embodiments includes the computer-readable instructions 220 of a user application 222. In the embodiment illustrated in FIG. 1, the user application 222 allows the user system 204 to be linked to the system server 208 to communicate, via a network 201. In this way, a user 202 may open a financial institution account, apply for credit cards, remotely communicate with the financial institution, authorize and complete a transaction, or complete a transaction using the user system 204 via a digital wallet. The user application 222 may also allow the user system, for example, a mobile device to connect directly (i.e. locally or device to device) with the merchant system 206 for performing a transaction. The user application 222 may perform one or more of the steps and/or sub-steps discussed herein and/or one or more steps not discussed herein. For example, in some embodiments, the user application 222 may initiate presentation of an interface for digital wallet management. Furthermore, the user application 222 may receive, based on instructions, a token from the system server 208 and store on the memory device 216 of the user system 204 in some embodiments. The user system 204 may be, for example, a desktop personal computer, a mobile system, such as a cellular phone, smart phone, personal data assistant (PDA), laptop, wearable device or the like. For example, in some embodiments, the user system 204 may comprise one or more user devices comprising mobile phones, tablets, smartphones, computers and wearable devices like smart watches, glasses, jewelry, fitness and activity monitors and the like.

As further illustrated in FIG. 1, the system server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the merchant system 206 and the user system 204. As such, the communication device 246 generally comprises a modem, server, or other device for communicating with other devices on the network 201. As further illustrated in FIG. 1, the system server 208 comprises computer-readable instructions 254 stored in the memory device 250, which in one embodiment includes the computer-readable instructions 254 of a system application 258. In some embodiments, the memory device 250 includes data storage 252 for storing data related to the system environment, but not limited to data created and/or used by the system application 258. The application 258 may perform one or more of the steps and/or sub-steps discussed herein and/or one or more steps not discussed herein.

As illustrated in FIG. 1, the merchant system 206 is connected to the system server 208 and is associated with a merchant selling products or services. In this way, while only one merchant system 206 is illustrated in FIG. 1, it is understood that multiple merchant systems may make up the system environment 200. The merchant system 206 generally comprises a communication device 236, a processing device 238, and a memory device 240. In some embodiments, the processing device 238 may send or receive data from the user system 204 and/or the system server 208 via the communication device 236. Such communication may be performed either over a direct connection and/or over a network 201. As such, the communication device 236 generally comprises a modem, server, or other device for communication with other devices on the network 201. In some embodiments, the merchant system 206 comprises computer-readable instructions 242 stored in the memory device 240, which in one embodiment includes the computer-readable instructions 242 of a merchant application 244.

In the embodiment illustrated in FIG. 1, the merchant application 244 provides products and services to a user 202 and is part of one or more user transactions. In some embodiments, the merchant application 244 may be part of a network associated with the merchant that provides products and services to a user 202 via online or mobile means. Furthermore, the merchant application 244 may be associate with a brink-and-mortar merchant location. As such, the merchant application 244 may be a part of one or more user transactions when the user 202 transacts with the merchant. As further illustrated in FIG. 4, the merchant system 206 comprises computer-readable instructions 242 of an application 440. In the embodiment illustrated in FIG. 4, the application 440 allows the merchant system 206 to be linked to the system server 208 to communicate, via a network 201. The merchant application 244 may also allow the user system 204 to connect directly (i.e., locally or device to device) with the merchant system 206 or indirectly through the network 201. The merchant application 244 may perform one or more of the steps and/or sub-steps discussed herein and/or one or more steps not discussed herein. Furthermore the merchant application 244 may receive one or more tokens or payment credentials as a payment vehicle for a transaction at the merchant.

It is understood that the servers, systems, and devices described herein illustrate one embodiment of the invention. It is further understood that one or more of the servers, systems, and devices can be combined in other embodiments and still function in the same or similar way as the embodiments described herein.

In various embodiments, the merchant system may be or include a merchant machine and/or server and/or may be or include the mobile device of the user may function as a point of transaction device. The embodiments described herein may refer to the use of a transaction, transaction event or point of transaction event to trigger the steps, functions, routines etc. described herein. In various embodiments, occurrence of a transaction triggers the sending of information such as alerts and the like. Unless specifically limited by the context, a "transaction", "transaction event" or "point of transaction event" refers to any communication between the user and the merchant, e.g. financial institution, or other entity performing transactions for the user. In some embodiments, for example, a transaction may refer to a purchase of goods or services, a return of goods or services, a payment transaction, a credit transaction, or other interaction involving a user's bank account. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user device, such as a mobile device establishes a wireless connection, such as a Wi-Fi connection, with a merchant system such as a point-of-sale terminal. In some embodiments, a transaction may include one or more of the following: purchasing, renting, selling, and/or leasing goods and/or services (e.g., groceries, stamps, tickets, DVDs, vending machine items, etc.); withdrawing cash; making payments to creditors (e.g., paying monthly bills; paying federal, state, and/or local taxes and/or bills; etc.); sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

As used herein, a "user device" or "mobile device" may be a point-of-transaction device as discussed, or may otherwise be a device carried by a user configured to communicate across a network such as a cellular network, wireless fidelity network or otherwise. As used here a "user" refers to a previous customer or a non-customer of one or more merchants or entities associated with one or more merchants.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device, and/or various combinations of the foregoing.

In some embodiments, a point-of-transaction device is operated in a public place (e.g., on a street corner, at the doorstep of a private residence, in an open market, at a public rest stop, etc.). In other embodiments, the point-of-transaction device is additionally or alternatively operated in a place of business (e.g., in a retail store, post office, banking center, grocery store, factory floor, etc.). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, etc.). In yet other embodiments, the point-of-transaction device is owned by the financial institution offering the point-of-transaction device providing functionality in accordance with embodiments of the invention described herein.

FIGS. 2 through 4 illustrate a number of different ways that the user 202 may use one or more tokens in order to enter into a transaction, as well as how the parties associated with the transaction may process the transaction. FIG. 2, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 2 (as well as in FIGS. 3 and 4), a user 202 may utilize a payment device 4 (or in other embodiments a payment instrument over the Internet) to enter into a transaction. FIG. 2 illustrates the payment device 4 as a mobile device, such as a smartphone, personal digital assistant, or other like mobile payment device, however in some embodiments, the payment device 4 may be any user system 204. Other types of payment devices 4 may be used to make payments, such as but not limited to an electronic payment card, key fob, a wearable payment device (e.g., watch, glasses, or the like), or other like payment devices 4. As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument (e.g., a payment application that stores the token) may be used to enter into the transaction. The payment instrument may be the same as the token or digital wallet associated with the payment device 4, except they are not associated with specific payment device. For example, the token or digital wallet may be associated with a payment application that can be used regardless the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 202 with the one or more payment devices 4 may utilize the token. Alternatively, the payment device 4 may have one or more digital wallets stored on the payment device 4 that allow the user 202 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 2 and merchants 10.

As illustrated in FIG. 2, a tokenization service 50 may be available for the user 202 to use during transactions. As such, before entering into a transaction, the user 202 may generate (e.g., create, request, or the like) a token in order to make a payment using the tokenization service 50, and in response the tokenization service 50 provides a token to the user and stores an association between the token and the user account number in a secure token and account database 52. In some embodiments the tokenization service may provide the user with a token in encrypted form for added security, such that only intended recipients (for example: tokenization service 50, issuing financial institution 20, payment device 4 or the like) may identify and/or decrypt the token data. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, any other limit described herein, or the like) associated with the token that may limit the transactions in which the user 202 may enter. The limits may be placed on the token by the user 202, or another entity (e.g., client, administrator, person, company, or the like) responsible for the transactions entered into by the user 202 using the account associated with the token. The generation of the token may occur at the time of the transaction or well in advance of the transaction, as a one-time use token or multi-use token.

After or during creation of the token the user 202 enters into a transaction with a merchant 10 using the payment device 4 (or payment instrument over the Internet). In some embodiments, the user 202 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 202 is entering with the merchant 10.

The merchant 10 submits the token (as well as any user account information not substituted by a token) and the transaction information for authorization along the normal processing channels (also described as processing rails), which are normally used to process a transaction made by the user 202 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, device information associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described occurs when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the tokenization service indicates that the transaction meets the limits), then the acquiring financial institution 20 thereafter sends the user account number, the other user information, and the transaction information directly to the issuing financial institution 40, or otherwise indirectly through the card association networks 30. The issuing financial institution 40 determines if the user 202 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 202 is completed. After the transaction is completed the token may be deleted, erased, or the like if it is a single-use token, or stored for further use if it is a multi-use token. In some embodiments, a multi-use token may be accompanied by or may include unique passcodes generated for every transaction. In this regard a key may be used to generate dynamic security codes for each transaction.

Instead of the process described above, in which the acquiring financial institution 20 requests the token from the tokenization service 50, in some embodiments, the tokenization service 50 may receive the transaction request and transaction information from the merchant 10 or acquiring financial institution 20. Instead of providing the account number to the acquiring financial institution 20, the tokenization service 50 may send the transaction request and transaction information to the issuing financial institution 40 directly, or indirectly through the payment association networks 30.

The embodiment illustrated in FIG. 2 prevents the user account number and other user information from being presented to the merchant 10; however, the tokenization service 50, acquiring financial institution 20, the card association networks 30, and the issuing financial institution 40 may all utilize the actual user account number and other user information to complete the transaction.

FIG. 3 illustrates another embodiment of a token system process 1, in which the user 202 may utilize a payment device 4 (or payment instrument over the Internet) to enter into transactions with merchants 10 utilizing tokens instead of user account numbers. As illustrated in FIG. 3, the user may have one or more tokens, which may be associated with the payment device 4, one or more digital wallets within the payment device 4, or one or more user accounts associated with the digital wallets. The one or more tokens may be stored in the user's payment device 4 (or on the digital wallet), or stored on a cloud or other service through the issuing financial institution 40 or another institution. The user 202 may set up the digital wallet by communicating with the issuing financial institution 40 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 10) and include one or more tokens provided by the issuing financial institution 40 directly (or through the merchant as described with respect to FIG. 4). In other embodiments, the issuing financial institution 40 may create the digital wallet for the user 202 (e.g., through a wallet created for a business client or retail client associated with the user 202) and include one or more tokens for various types of transactions, products, or the like. The issuing financial institution 40 may store the tokens, the associated user account information (e.g., including the user account number), and any limits on the use of the tokens, as was previously described with respect to the tokenization service 50 in FIG. 2. In one embodiment the tokens may include user account information or routing information within the token or tied to the token, which allows the merchants 10 and other institutions in the payment processing systems to route the token and the transaction information to the proper institutions for processing. In other embodiments a tokenization routing database 32 may be utilized to determine where to route a transaction using a token, as described in further detail later.

The user 202 may enter into a transaction with the merchant 10 using a payment device 4 (or a payment instrument through the Internet). In one embodiment the user 202 may enter into the transaction with a token associated with the payment device 4 itself (or a payment instrument through the Internet). In other embodiments, a specific digital wallet and/or a specific account within the digital wallet may be selected for a particular merchant with whom the user 202 wants to enter into a transaction. For example, the user 202 may select "wallet 1" to enter into a transaction with "merchant 1" and "token 1" to utilize a specific account. The merchant 10 identifies the token, and sends the token and the transaction information to the acquiring financial institution 20. If the token has routing information the acquiring financial institution 20 may route the token and transaction data to the issuing financial institution 40 directly or through the card association networks 30. In situations where the token does not have associated routing information, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with the tokens and the corresponding issuing financial institutions 40 to which transactions associated with the tokens should be routed. However, in some embodiments, no customer account information would be stored in this tokenization routing database 32, only the instructions for routing particular tokens may be stored.

Once the token and transaction details are routed to the issuing financial institution 40, the issuing financial institution 20 determines the user account associated with the token through the use of the token account database 42. The financial institution determines if the funds are available in the user account for the transaction and if the transaction information meets other limits by comparing the transaction information with the limits associated with the token, the user account associated with the token, or other limits described herein. If the transaction meets the limits associated with the token or user account, then the issuing financial institution 20 allows the transaction. If the transaction information does not meet one or more of the limits, then the issuing financial institution 20 denies the transaction. The issuing financial institution sends a notification of the approval or denial of the transaction back along the channels of the transaction processing system to the merchant 10, which either allows or denies the transaction.

The embodiment illustrated in FIG. 3 allows the user and the financial institution to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 202.

FIG. 4 illustrates another embodiment of the token system process 1, in which the user 202 may utilize a payment device 4 (or payment instrument over the Internet) to enter into transactions with a merchant 10 utilizing a token instead of a user account number and/or other user account information. As illustrated in FIG. 4, the user 202 may have one or more tokens associated with the payment device 2, the one or more digital wallets, or one or more user accounts within the digital wallets. The one or more tokens may be stored in the user's payment device 4 (or within the digital wallet), or stored on a cloud or other service through the issuing financial institution 40 or another institution. The user 202 may set up the digital wallet by communicating with the issuing financial institution 40 (e.g., the user's financial institution) and/or the merchant 10 to request a token for the payment device 4, either for the payment device 4 itself, for the one or more digital wallets stored on the payment device 4, or for user accounts within the digital wallet. The financial institution 40 may have a dedicated group of tokens that are associated with a specific merchant, and as such the merchant 10 and the issuing financial institution 40 may communicate with each other to provide one or more tokens to the user 202 that may be specifically associated with the merchant 10. For example, the issuing financial institution may provide a set of tokens to "merchant 1" to associate with "wallet 1" that may be used by one or more users 2. As such "Token 10" may be associated with "wallet 1" and be specified only for use for transactions with "merchant 1."

The merchant 10 may provide the specific tokens from the financial institution 40 to the user 202, while the financial institution 40 may store the user account information with the token provided to the user 202. The financial institution may communicate directly with the user 202, or through the merchant 10 in some embodiments, in order to associate the token with the user 202. Since the merchant 10 provides, or is at least notified by the financial institution 40, that a specific token, or groups of tokens, are associated with a specific issuing financial institution 40, then the merchant 10 may associate routing information and transaction information with the token when the user 202 enters into a transaction with the merchant 10 using the token.

The merchant 10 passes the token (and potentially other user account information), routing information, and transaction information to the acquiring financial institution 20 using the traditional payment processing channels. The acquiring financial institution 20, in turn, passes the token (and potentially other user account information) and transaction information to the issuing financial institution 40 directly, or indirectly through the payment association networks 30 using the routing information. The issuing financial institution 40 accesses the token and account database 42 to identify the user account associated with the token and determines if the transaction information violates any limits associated with the token or the user account. The issuing financial institution 40 then either approves or denies the transaction and sends the approval or denial notification back through the payment processing system channels to the merchant 10, which then notifies the user 202 that the transaction is allowed or denied.

As is the case with the token system process 1 in FIG. 3, the token system process 1 in FIG. 4 allows the user 202 and the financial institution 40 to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 202.

The embodiments of the invention illustrated in FIGS. 2 through 4 are only example embodiments of the invention, and as such it should be understood that combinations of these embodiments, or other embodiments not specifically described herein may be utilized in order to process transactions between a user 202 and merchant 10 using one or more tokens as a substitute for user account numbers or other user account information, such that the merchant 10, or other institutions in the payment processing system do not have access to the actual user accounts or account information.

As briefly discussed above, if the issuing financial institution 40 creates the digital wallet not only does the issuing financial institution 40 receive transaction information along the normal processing channels, but the financial institution 50 may also receive additional transaction information from the user 202 through the digital wallet using the application program interfaces (APIs) or other applications created for the digital wallet. For example, geographic location information of the user 202, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 202, the issuing financial institution 40 may not receive all the transaction information from the traditional transaction processing channels or from the digital wallet. As such, the issuing financial institution 40 may have to receive additional transaction information from another application associated with the user 202 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the users 2 enter into transactions using the digital wallets.

Moreover, when there is communication between the digital wallets of the users 2 and the issuing financial institution 40 or another institution, transactions in which the user 202 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 1 or in other token system processes not specifically described in FIGS. 2 through 4.

In some embodiments the system 208 presents an interface for managing digital wallets on the user system 204 via the user application 222. The interface may present one or more digital wallets separately or in an integrated manner. Each of the digital wallets may have at least one associated payment credential (e.g., tokens). The tokens, as shown in FIGS. 2 through 4, are sorted into different digital wallets. Also shown is a comprehensive listing of the tokens available for usage, and therefore, available for association and/or authentication into one or more digital wallets. In some embodiments, the interface may be managed and controlled by user application 222 on the user device. In some embodiments, the interface maybe managed and controlled by the system server 208, transmitting instructions to the application stored on the user device. In some embodiments, the user application 222 may continuously run in the background of the user system or user device 204 and may automatically initiate presentation of the interface in response to a trigger event comprising purchases, usage of tokens by an indirect user, receiving notifications/signals from a point of sale device, proximity to a point of sale device, modification of parameters associated with one or more tokens and the like. In some embodiments, the user 202 may initiate the presentation of the interface.

According to embodiments of the invention, during an online banking session, a customer or user 202 may use an interface to select which payment credentials (cards (credit/debit), tokens etc.) are entered into which digital wallets (e.g., Google, PayPal, Apple Pay etc.). In some instances, the user 202 is given an opportunity to set limits for each wallet, and in some cases, the user 202 is provided an opportunity to set timeframe limits. The user 202 may use an interface for visibility into everywhere a payment credential (e.g., credit/debit card) is tied for payment, recurring or otherwise. In a digital wallet, the user 202 may provide recurring payment information, and "push-button billpay enrollment".

In some embodiments, the wallets may be owned and/or operated by one or more entities. In some embodiments, the wallets and/or the associated tokens may be stored at different locations. For example the wallet and one or more associated tokens may be stored on the cloud or on a server remote from the user device.

In some embodiments, the user 202 may be associated with one or more digital wallets, the wallets being owned and/or operated by different entities and/or the wallets being stored at different locations. In this regard the system (for example, the remote server 402 or the application 440) may automatically determine one or more wallets associated with the user based on retrieving information from one or more user devices, analyzing transaction history of the user, retrieving financial account activity, analyzing social media updates of the user, analyzing user information (for example, contact information) and financial information of the user and the like. In some embodiments, information associated with the wallets, for example authorization credentials, wallet identifiers and the like may be requested from the user at least for a first time, typically prior to execution of transactions. In some embodiments the interface is presented on the user system 204 by extracting information associated with the wallets and their tokens from their individual locations and presenting the wallets on a single interface.

In some embodiments, the integrated interface may be presented to the user in response to receiving authentication credentials from the user. In some embodiments the user may be authenticated by receiving and analyzing biometric information of the user, for example, fingerprint scans, iris recognition, retina scans, facial recognition, hand geometry, voice recognition and the like. In some embodiments the user may be authenticated based on behavioral characteristics like device usage patterns, typing rhythm, gait, gestures, heart rate and other characteristics. In some embodiments the user may be authenticated based on pre-authenticated auxiliary devices, for example a user in continued possession of a pre-authenticated auxiliary device (for example, a wearable device) in operative communication with the user device may be authenticated based on continued monitoring of the user device and the auxiliary device. In some embodiments the user may be authenticated based on received userID and passwords. In some embodiments each of the authentication methods described above may be assigned an authorization level, and the authentication methods may be user singularly or in combination to achieve a desired level of authorization. Therefore, the user may be provided access to one or more wallets though an integrated interface in a secure and convenient manner. For example, a user may be associated with: a first wallet stored on a cloud associated with a first entity, a second wallet stored on a remote server associated with a second entity and a third wallet associated with a third entity stored in a secure element of an auxiliary user device. The system may present an integrated interface that enables the user to access and modify the payment credentials or tokens associated with the wallets without requiring the user to access the payment credentials or tokens thorough conventional channels separately and without requiring the user to provide authentication credentials separately for each channel. In this regard the system may communicate with and/or establish operative communication channels between the user device, the auxiliary user device, the cloud associated with the first entity, the servers associated with the second entity and other third party systems.

In such a case, the payment credential has been "authenticated for use" in association with the digital wallet such that the user may select the digital wallet for performing a transaction using the associated payment credential or the system may automatically determine a suitable digital wallet when the user selects the payment credential for a transaction. In some embodiments, the system may require one or more authentication steps with the financial institution that issued the payment credential or the system may utilize the authentication the user provided for the presentation of the interface to authenticate the transaction. In some embodiments the system may seek confirmation from the user before executing the transaction with the appropriate payment credential and the suitable wallet. The user may provide confirmation in the form of voice commands, swipe/touch patterns on the screen of the user device, selection of one or more options presented on the interface, gestures, authentication means described previously, movement/orientation of the user device, or any other suitable means of indication. As discussed in further detail below, a payment credential may be authenticated for use with a digital wallet but may be de-selected for use with the digital wallet by the user (i.e., it may not be associated with the digital wallet), in which case, the user would not be allowed by the system to use the payment credential in a transaction with the digital wallet regardless of the fact that it has been authenticated for use with the digital wallet. In such a case, the user can use the interface to associate the already authenticated payment credential with the digital wallet and then perform the desired transaction in real time. In this regard the system may establish an operative communication channel with the entity systems, owning/operating the digital wallet and the location of storage of the payment credential, to extract information associated with the payment credential for display on the integrated interface and to modify one or more parameters associated with the payment credential, either at the storage location of the payment credential, at the entity systems or on the user device, based on received user input. In some embodiments, this may trigger one or more necessary steps fulfilled by the system either automatically or by seeking additional input from the user, such as authentication of the selected payment credential with the financial institution that issued the payment credential and/or authentication or other verification with the entity that maintains/issues/facilitates the digital wallet.

The processes flows described below may be performed by the system server 208, the merchant system 206, $3^{rd}$ party systems like other financial institution systems associated with the merchant accounts, payment routing associations and the like (not illustrated), the user system 204, either entirely or partially. For example, the system 208, may establish operative communication channels with one or more devices of the user system the user system 204 (for example, user mobile device, wearable device, auxiliary device, computing devices and the like), the merchant system 206, and the third party systems and/or between one or more of the above systems the like, such that the system 208 may perform non-intrusive geo-location determination may communicating with the other systems. In some embodiments, the operative communication channels established by the system 208 enables the other systems to perform one or more steps of non-intrusive geo-location determination that the systems may otherwise not be configured to perform or not be capable of execution. For example, the system may provide an improvement in technology by establishing a new communication channel between the user system 204 and the merchant system 206, such that the user system 204 may retrieve merchant credentials from the merchant system 206 (data storage 241, point of sale terminal for in-store transactions, identification credentials of the payment portal for online transactions) to enable the user to determine the authorization/validity of the merchant and/or the security of the payment portal prior to entering into a transaction either independently or in conjunction with the system 208. In this regard, the system may receive user authentication credentials for a first time and enable the user to access other systems through the established communication channels without requiring the user to access the systems thorough conventional channels separately and without requiring the user to provide authentication credentials separately for each channel.

In some embodiments the user may be authenticated based on behavioral characteristics like device usage patterns, typing rhythm, gait, gestures, heart rate and other characteristics. In some embodiments the user may be authenticated based on pre-authenticated auxiliary devices, for example a user in continued possession of a pre-authenticated auxiliary device (for example, a wearable device) in operative communication with the user device may be authenticated based on continued monitoring of the user device and the auxiliary device. In some embodiments the user may be authenticated based on received userID and passwords. In some embodiments each of the authentication methods described above may be assigned an authorization level, and the authentication methods may be user singularly or in combination to achieve a desired level of authorization. In this regard the system 208 may communicate with and/or establish operative communication channels between the user device, the auxiliary user device, the cloud associated with the first entity, the servers associated with the second entity, the merchant systems and other third party systems, by providing required credentials to the other systems for enabling access, based on at least the received authentication credentials of the user and/or the location of the user. In this regard the system 208 may only temporarily store relevant information associated with the user payment credentials or the merchants on the user device, thereby preserving the security of the data and with minimal memory requirements. In some embodiments, the system may store some or all of the in a secure memory location either on the user device and/or on a memory device associated with the system 208 so that the user may perform at least part of the transactions both online and offline. Typically the secure memory location on the user device is an isolated location, with very limited interaction with the rest of the operating system, with a high required level of authorization for access. In some embodiments, the secure memory location may be a secure element comprising an integrated circuit chip of the user device (for example the Subscriber Identification Module (SIM) card or an Embedded Universal Integrated Circuit Card (eUICC) of a phone or a tablet device) or a separate isolated section of the user device's memory.

Referring now to FIG. 5, illustrating a high level process flow 500 for non-intrusive geo location determination associated with transaction authorization in accordance with some embodiments of the invention. The process flow 500 includes, as represented by block 530, receiving information regarding at least one transaction associated with a user. In some embodiments the system, for example, the system 208 of the system environment 200, receives information regarding at least one transaction in real time. In this regard the system may receive information regarding at least one transaction that the user initiates or seeks to initiate, at least one transaction that the user in in the process of executing and/or at least one transaction that the user has completed. For example, the system may receive an indication that the user wishes to initiate at least one transaction with one or more merchants, as illustrated by block 510. In this regard, in some embodiments, the system may receive the indication from the user, a user device, financial institutions owning and/or operating one or more user accounts and/or payment instruments associated with one or more user accounts, merchants associated with the at least one transaction and/or entities associated with merchant accounts.

In some embodiments the system may receive the information regarding one or more transactions and/or perform the one or more subsequent steps of the process flow 500 during the initiation of the transaction. In this instance, the non-intrusive geo location determination is associated with authenticating the user, authorizing the user to perform the at least one transaction, validating the payment credentials of the user, approving the at least one transaction and/or authorizing the transactions themselves based on at least authenticating the merchant. In other embodiments, in addition to or separately from the previous embodiments, the system may receive the information regarding the at least one transaction and/or perform one or more subsequent steps of the process flow 500 during the execution of the transaction, for example in the time period between the initiation and completion of the at least one transaction by the user. Completion of the at least one transaction, typically includes in some embodiments, completion or termination of the transaction from the user's perspective. For example, in some embodiments, a transaction is complete when at least the user is authenticated, the payment credentials are verified and the transaction is authorized and/or approved, after which the user considers the transaction complete and may leave the store, log off the merchant's website/payment portal, terminate the telephone call and the like. As another example, completion of the at least one transaction, in some embodiments, comprises the merchant submitting the relevant information associated with the at least one transaction to a financial institution/entity for settlement, placing the one or more of the at least one transaction in a pending transaction queue for settlement and the like. In some embodiments, the transactions are temporarily authorized in the completion stage and are later routed for further processing and settlement.

In some embodiments, the system may receive the information regarding the at least one transaction and/or perform the subsequent steps of the process flow 500 after the completion of the transaction, for example, in the time period between the completion of the at least one transaction by the user and the settlement of the at least one transaction at a predetermined future settlement date, in combination with or distinctly from the previous embodiments. The predetermined future settlement date may comprise settlement of the transactions by the user's financial institution, by the merchant or a financial institution associated with the merchant, debiting of the user account or posting payments after prior temporary authorization, transmitting funds associated with the at least one transaction to the merchant/merchant account and the like. For example, the system may retrieve the at least one transaction from the transaction history associated with the user, as illustrated by block 520.

The transaction history may comprise information associated with one or more completed transactions that are in the process of being settled, one or more pending transactions, one or more settled transactions, one or more posted transactions or a combination of the above. In this regard, the transaction history may comprise one or more of: user information (financial instruments used in the transaction, financial accounts of the user, prior transactions of the user and the like), location of the transaction (based on the received location of the user, location of the merchant or both), transaction amounts, type of transaction (online, in person or by phone), merchant associated with the at least one transaction (merchant name, merchant category codes and the like), time and date of the at least one transaction (time stamps associated with the initiation of the transaction, completion of the transaction, posting and/or settlement of the transaction), status of the transaction (posted, pending, completed, in the process of settlement and the like), one or more products/services associated with the transactions (product name, product category code), and the like. In this regard, in some embodiments, the system may receive information associated with one or more transaction and/or transaction history of the user/merchant from the user, a user device, financial institutions owning and/or operating one or more user accounts or payment instruments associated with one or more user accounts, merchants associated with the at least one transaction and/or entities associated with merchant accounts. In some embodiments, the system may perform non-intrusive geo location determination after the completion of the transaction and prior to the predetermined future settlement date to validate the at least one transaction, to allow/authorize the at least one transaction for further processing and settlement, to enable posting of the at least one transaction and the like. In some embodiments, the system may perform non-intrusive geo location determination after the settlement of the at least one transaction to analyze the transaction parameters/patterns of the merchant/the user, to authorize or validate one or more future transactions of the user, to ensure that the transactions were carried out by the authorized user and the like while maintaining the privacy and security of the user's personal data.

Next, as illustrated by block 540, the system determines a transaction location associated the at least one transaction. In this regard, the system analyses the transaction information received at block 530 to determine the transaction location. For example, the system may determine the transaction location based on the location of the point of transaction terminal at which the user executes a transaction. In this regard the merchant may have multiple locations, each location having one or more transaction terminals, therefore, the system may compare a received transaction terminal identifier against a merchant database of point of transaction terminals and identify the merchant location. The database may be searchable and retrievable database comprising transaction terminal identifiers and the corresponding merchant facility location, type of transactions allowed (for example, credit card transactions, debit card transactions, digital wallet payments, token or payment credentials, card providers accepted and the like) and other parameters. As another example, the location of in-store transactions may be determined based on the merchant associated with the transaction. In this regard the system may receive the merchant identifier and determine the transaction location based on analyzing a plurality of facility locations of the merchant. In some embodiments, for online transactions, the merchant may compare the location of the user device with the billing address of the user before authorizing the transactions. In this regard the merchant or an associated entity may determine the user device location based on the Internet Protocol address (IP address) of the device, network triangulation of the call received from the device for purchases made by phone, information received from a SIM card associated with the device, from information received from the network providing entity and the like. In turn, the system may receive this location information from the merchant and designate the location as the transaction location.

In some embodiments, the determined transaction location may be as specific/precise or as broad or expansive as the user desires or grants permission for. In some embodiments a suitable precision of the determined transaction location is chosen based of the level of authentication desired. The desired level of authentication may be determined by the user, by the system, by the merchant or any other participating entity. Examples of broad/expansive transaction locations, with lower relative precision, may comprise a country, a state, a city associated with the at least one transaction and the like. Examples of specific/narrow transaction locations may comprise a street address, a zip code associated with the transaction and the like. In some embodiments, the system determines the transaction location based on analyzing the retrieved transaction information (for example, transaction information associated with the user transaction history, information received from the merchant during initiation and/or completion of the at least one transaction). In some embodiments, the system may determine the transaction location in real time based on information received from the user or the merchant or an associated entity during initiation of at least one transaction, before/after completion of the at least one transaction to determine the validity of the transaction to allow the transaction to be completed/processed. In some embodiments, the may determine the transaction location of the at least one transaction that are in the process of being settled or at least one transaction that have been settled.

In some embodiments, the system may also determine a transaction date and a transaction time associated with the at least one transaction, as illustrated by block 550. The system may conduct the step 550 in conjunction with the previous steps or in any suitable order. Typically the transaction location is correlated with the transaction time and date. In some embodiments, the transaction date and time is received as a part of the transaction information associated with the at least one transaction. In some embodiments, the transaction time is determined from time stamps associated with the initiation of the transaction and/or completion of the transaction received in real time or after the completion of the transaction or during posting/settlement of the at least one transaction (for example, from the user transaction history). In some embodiments, the system timestamps the requests for initiation, completion and/or settlement of the at least one transaction as and when they are received at the system, while in other embodiments the transaction requests are time stamped by the merchant system, the user system or another associated third party system.

Next, the system may determine at least one user device associated with the transaction date and the transaction time, as illustrated by block 560. The at least one user device may be a user device utilized to at least partially conduct the at least one transaction or another user device not associated with the at least one transaction. For instance, the system may analyze the received transaction information and determine that the user initiated the at least one transaction with a payment credential/token from the digital wallet of the user's mobile phone. In this regard, the system may determine the user's mobile device to be the at least one user device. The user device may be a mobile phone, a smart phone, a wearable device, a computer, a personal digital assistant or another computing device. In some embodiments, the system may determine at least one user device based on analyzing transaction history of the user. For example, the system may determine that the user checked an account balance using a wearable device, based on analyzing the transaction history of the user. In some embodiments, for example in instances where the transaction information is received after the completion of the transaction, the system may determine the at least one user device by determining user's transactional and social media activity at or around the transaction date and time and determine the at least one user device to be the device used for the activities. As another example, the user may register one or more user devices. In some embodiments the user devices may have one or more applications running/installed on them. In this instance the system may determine the at least one user device based on the installation, usage or data received from the application. The one or more applications may be a financial institution application operated by/connected to the system, a merchant application, an application/widget or software inherent to the device or one or more third party applications. Typically, the one or more applications may be configured to, at least in part, aid in the non-intrusive geo location determination. The one or more applications may be exclusive to non-intrusive geo location determination functions or may perform these functions in addition to others. In some embodiments, the one or more applications configured for non-intrusive geo location determination are operatively connected to the Global Positioning Systems (GPS), other location determining systems, sensors monitoring the parameters of the user device, sensors monitoring the physical parameters of the user and the like, associated with the at least one user device.

In some embodiments, the one or more applications act as a barrier between the location determination systems and the like of the user device and other applications and systems. The one or more applications may restrict access to location information comprising current location information of the device/the user, travel history and the like to protect the user's personal information and privacy. In this regard, the application may store the location information received from the location determining systems in an isolated, secure portion of a memory of the user device or a secure element of the user device in real time, such that the stored location information is accessible only be the application. In some embodiments, the application transmits control instructions to the location determining system of the user device in real time to determine the current location. In some embodiments, the system is not granted direct access to the location information stored on the user device, but may receive indications about user location by querying the one or more applications. In some embodiments, the one or more applications require authentication/authorization credentials or user permissions from the system, applications or other external systems to retrieve location data from the isolated portion of the memory. In some embodiments the one or more applications may transmit responses only in the form of affirming or negating a query, without transmitting the actual location information, for example GPS coordinates to further enhance the privacy of the user.

In some embodiments, the one or more existing applications may not be configured to perform non-intrusive geo location determination. In this regard, the system may access the application, and transmit control signals and relevant instructions to make the one or more applications compatible for non-intrusive geo location determination. For example, the system may establish communication channels between the location determining system of the user device and the existing applications and the by providing the required authorization credentials. Furthermore, the system may enable creation of an isolated memory location for storage of location information. In other embodiments, the system may automatically initiate installation of one or more new applications configured to perform non-intrusive geo location determination (for example, receive and decode one or more polar queries and transmit answers in the affirmative or in the negative based on retrieving location information from location determining systems of the user device). In this regard, the system may automatically install or seek permission from the user to install the one or more applications on the user device. These applications may function similar to the one or more applications described above. In some embodiments, the application for non-intrusive geo location determination may be running in the background on the user device. The system may establish a communication channel with the user device transmit control instructions via the channel to cause the application to be automatically presented to the user via an interface, in response to the transmission of one or more queries to determine the user location.

In some embodiments the system may determine that the user is associated with a plurality of user devices, with only a portion of the user devices comprising the one or more applications configured for non-intrusive location determination. The system may then determine one or more of the remaining portion of the user devices are capable of supporting the one or more applications and seek to install the one or more applications on the devices. While some user devices like wearable devices may not be compatible with the one or more applications, nevertheless, in some embodiments, the system may link all the user devices to each other such that user possession/authentication of one or more devices can be determined based on the linking. For example, the system may link a wearable device with a user mobile phone with the one or more applications installed, and recognize that the user authenticated themselves for a first time with the wearable device by providing biometric authentication, the system may then verify that the user device is in proximity of a user adorned wearable device to determine authentication of the user. As another example, the system may determine that the user has authenticated via a passcode on one device and may authenticate the user on another linked device based on the received passcode and determining that the user has been in continued possession of the devices. As another example, the user may conduct at least one transaction comprising online purchases on a computing device, without location determination capability. However, the system may determine that an auxiliary user device, for example, a wearable fitness monitoring device, linked to the user device has this capability. Then, the system may query the auxiliary device to determine user location based on determining that the auxiliary device was in the possession of the user at the transaction time and/or that the devices were paired or linked at the transaction time. Therefore, in some embodiments the at least one user device may be the device used to initiate the at least one transaction, while in other embodiments, the at least one user device may be another device linked to the device used to initiate/perform the at least one transaction or a device in the user's possession at the time of the transaction. In some embodiments, the system may determine a plurality of user devices and then choose optimal user devices based on determination of one or more factors comprising frequency of use, probability of being in the user's possession, received user preference, type of transaction and the like.

In some embodiments the one or more applications may transmit responses only in the form of affirming or negating a query, without transmitting the actual location information, for example GPS coordinates to further enhance the privacy of the user. Therefore, the system may formulate one or more queries related to the at least one transaction, such that the one or more queries can be answered in the affirmative or in the negative, as illustrated by block 610 associated with high level processes flow for non-intrusive geo location determination and transaction authorization illustrated in FIG. 6. Typically the one or more queries are configured to determine if the user was at the transaction location at or around the transaction time. In some embodiments the system may determine a transaction time interval spanning a predetermined time before and/or after the transaction time (for example, 10 minutes, 1 hour or any other suitable predetermined time estimated based on the analyzing the transaction information) and determine if the user was at the transaction location during the time interval. In some embodiments, the one or more queries are polar questions or logic queries with two possible dichotomous answers. The system may then transmit a request to the at least one user device to determine a user location, wherein the request comprises the one or more queries at block 620. In some embodiments the system may transmit the request to the one or more applications configured for non-intrusive geo location determination. In some embodiments, the request comprising the one or more queries may be encrypted/encoded by the system to transform the data into a new format such that only the designated application on the user device may comprise the decryption key or may be able to decrypt/decode the request for further processing, thereby improving the security of the user's personal information. The system may then receive a response from the at least one user device, wherein the response comprises answers to the one or more questions in the affirmative or in the negative, at block 630. In some embodiments, the application stored on the user device may transmit the response in an encrypted/encoded format achieved by transformation of data such that only the system or authorized entities can decrypt the response. The working of the system and the one or more applications in the steps 610 through 630 for non-intrusive geo location determination is described in further detail below.

As an example scenario, the system or another application within the user device or another external system may seek to determine either a current or previous location of the user device and hence the location of the user and transmit a query to the one or more applications configured for non-intrusive geo location determination. The one or more applications may access the stored location information and determine either a current or previous location of the device, for example, City A or GPS coordinates 1. Continuing with the example, however, the one or more applications typically would not transmit information that the user is at City A or at certain specific coordinates. Instead the one or more applications may transmit a response to the query in the form of affirming or negating the query: (a) the query, "Is the user at City B?" or "City B" would result in the one or more applications transmitting "No" or "negative" or "false" (or a binary equivalent, or another similar polar response) as an answer while (b) the query, "Was the user at City A at a time period T?" or "City A at time T" would result in the one or more applications transmitting "Yes" or "affirmative" or "true" (or a binary equivalent, or another similar polar response). Since the one or more applications merely affirm the existing information with the querying applications/systems, typically only those querying applications/systems that already have at least a portion of or an indication regarding the user's location data (received from the user, or received from at least one transaction associated with the user and the like) can confirm the information. Therefore, the invention prevents unsolicited and unwanted location gathering by systems that the user is not affiliated with or the systems that did not recently enter into transactions with the user and prevents location determination/tracking without the user's permission. In some embodiments, the system may formulate the one or more queries in progressively decreasing order of geo-fencing area. For example, the system may first determine the user location determining a country, then a state and subsequently a zip code. However, in other embodiments, the system may formulate queries comprising random or the smallest geo-fencing area. For instance, the system may receive the transaction location comprising a town G and a zip code L. The system may then formulate a query to determine if the user was within the zip code L at the transaction time or choose a portion of the transaction location address randomly. As another example, the system may receive a transaction location comprising city P. The system may determine that one or more cities P are associated with a country R at different states of country R and transmit a polar query to determine if the user was in the country R at the time of the transaction. The system may transmit further queries to determine the particular city P and the state associated with the transaction after the application on the user device confirms that the user is/was in the country R at the time of the transaction. If the system receives the response that the user is/was not in the country R, the system may determine that the user location is not the same as the transaction location and initiate other forms of validity checks, without querying each of the one of more cities in country R, thereby saving processing time. Therefore, in some embodiments, the subsequent queries are formulated based on the received response to the previous queries.

In some embodiments, the system may enable the user to specify, collectively or individually, location information precision, query frequency or number of query sessions, number of queries per session, time frame of validity of the permission and the like in real time, or at a time prior to the query session. For example, the user may specify via the one or more applications, that a particular system B or a certain group of systems are permitted to initiate a maximum of four query sessions in a day, with each query session having at most 3 questions with this permission being valid for two days. For example, the user may specify that a particular system C or a certain group of systems may receive the location information up to a precision of a street address or only up to the precision of a city/state or a country. As another example, the user may specify that the user device may respond to queries only within one hour after initiation of the transaction using one or more payment credentials or payment instruments.

In the current system, a user device for example, a smartphone or a mobile device, may have multiple applications accessing the location information generated by the location determining systems of the user device. For example, multiple applications may simply receive the accurate location information of the user device, right from the time of installation. The location information may be used for advertising, marketing and other purposes and shared with external entities with or without the permission of the user. This personal data of the user is transferred between multiple entities and maintaining the security of the data may no longer be feasible. The user typically simply cannot control the precision and frequency of the location information being shared with the applications. While the user may deactivate the location determining systems or turn off the user device, this would inhibit the user from performing transactions with the user device, thereby precluding the user from performing at least one transaction in a fast and convenient manner. For example, although turning off the location determining systems may, in some measure, aid the user by preventing unsolicited location inquiries or advertising information, this would also prevent the user from conducting financial transactions, specifically those that require the user location to authenticate the user and/authorize the transaction quickly and conveniently, prevent the user from using navigation systems and the like and therefore impede the functioning of the user and/or the device.

This invention is necessarily rooted in computer networks to solve a technical problem specifically arising in the realm of computer networks, transaction authentication and the use of mobile user devices. The present invention provides a solution to the problem of authenticating the user and enabling the user to perform/process at least one transaction by utilizing the user location without invading the user's privacy and while maintaining the security of the user's personal data. The present invention is advantageous since it protects the user's personal data and maintains the privacy of the user, while still allowing the user to conduct at least one transaction and be authenticated based on the user location.

Next at block 640, the system may determine the validity of the at least one transaction based on, at least in part, determining that the user location is the same as the transaction location. In this regard the system may analyze the response from the user device to determine if the user location is the same or proximate to the transaction location and designate a transaction to be valid based on the congruence/coincidence of the locations. If the system determines that the user location is not the same as the transaction location, the system may determine that the at least one transaction are not valid and further initiate other forms of validity checks. In the embodiments in which the system receives information regarding at least one transaction in real time, for example in the time period after the initiation of the transaction and before the completion of the transaction, the system may authorize and/or allow the at least one transaction based on at least determining that the transactions are valid and that the user location is same as the transaction location, at block 650. In this regard, the system may enable the at least one transaction to be processed and completed. In some embodiments, the system may enable the processing of the at least one transaction at a predetermined future settlement date based on determining the validity of the transactions, as illustrated by block 660. In this regard, the system may verify the congruence of the user location with the transaction location prior to settlement/posting of the at least one transaction, for increased confidence in the transactions for quicker processing and/or processing with fewer rules.

In some embodiments, the system enables the user to determine the validity of at least one transaction that are pending and being processed or that have been settled and/or posted. For example, the user may review the user's pending transactions or the user's transaction history displayed on a user device. The user may not recollect or more transactions or may seek to confirm the validity the at least one transaction. In this regard the system may retrieve information associated with the at least one transaction and perform one or more steps of process flows 500 and 600 to determine the validity of the at least one transaction. The system may then transmit confirmation of the validity of the at least one transaction to the user device. As another example, the user may request the confirmation of one or more transactions associated with a credit card assigned to a secondary user (for example, the user's child) for a predetermined time period. The system may perform one or more steps of process flows 500 and 600 to determine the validity of the one or more transactions and initiate the display of a map, augmented with a route comprising the locations and times of the transactions executed by the secondary user. In this regard the system may retrieve the map from a database or a third party system based on determining the city, locality and the like from the transaction information. The system may then query the user device associated with the secondary user and verify whether the transaction location is same as the secondary user location. The system may then formulate a route comprising determined secondary user locations at the date and times of the one or more transactions.

Referring now to FIG. 7, illustrating a high level process flow 700 for transaction authorization based on user location and/or the transaction amount in accordance with some embodiments of the invention. The process flow 700 includes, as represented by block 710, establishing an operative communication link with a point of sale terminal associated with a merchant. In this regard, in some embodiments, the system is in operative communication with the point of sale terminal, a transaction terminal or any device through which the user seeks to perform a transaction by providing requisite authentication credentials. In some embodiments, the system establishes communication with the point of sale terminal associated with a merchant through a network either directly or via merchant systems or via user devices. In some embodiments, the user device establishes communication with the transaction terminal through near field communication or by any other suitable means. In the embodiments in which the user seeks to initiate an online transaction, the system establishes communication with the user device, for example the user's computing device or mobile device. In some embodiments, establishing an operative communication link comprises enabling access to at least a portion of the databases associated with the point of sale terminal, the merchant system or the user device. In some embodiments, the secure communication link enables the system to transmit control signals, either directly or via the user device, that instruct the point of sale terminal to perform one or more functions.

Next, as illustrated by block 720, the system may receive an indication that the user has initiated a transaction with a payment credential, wherein the payment credential is stored in a mobile wallet associated with the user. In some embodiments, the system receives an indication that the user initiated a transaction at the point of sale terminal, in real time, either from a user device, a point of sale terminal or a merchant system associated with the transaction. In some embodiments, the system receives the indication via the established secure operative communication channel. For example, the system may receive an indication that the user initiated a transaction by utilizing a payment credential associated with a digital wallet either for online or in store transaction. In some embodiments receiving an indication may comprise receiving a request for transaction authorization or verification of authentication credentials of the user, either from the digital wallet application or from the merchant system. In some embodiments, receiving the indication of a transaction may be substantially similar to the embodiments described in block 510. In conjunction with the above step or subsequently, at block 730, the system may receive transaction information associated with the initiated transaction. The transaction information may be received from the point of sale terminal, the user device, the merchant systems, third party payment networks or any other suitable means.

In some embodiments, the transaction information comprises one or more parameters associated with the initiated transaction comprising at least a geographic location, a merchant, a merchant category code, a product code, a transaction amount, a method of payment and the like. In some embodiments, the geographic location may comprise the location of the user, the location of the merchant/the point of sale terminal associated with the merchant and the like. Typically, in some embodiments, the system receives the transaction location as a part of the transaction information. However, in other embodiments the system may communicate with the merchant systems, the user device and other third party systems to determine the transaction location. In some embodiments, the system may determine the transaction location based on the location of the user device with the digital wallet used to initiate the transaction. For example, the system may determine the location of the user device based on non-intrusive location determination described above, global positioning systems of the user device, communication between the user device and one or more beacon/transmitter devices, social media updates of the user, analyzing the audio/video feeds of the user device and the like, based on receiving permissions from the user. In some embodiments, the system may receive or determine the method of payment from the transaction information. The method of payment may comprise the digital wallet, a user device, a payment credential, payment instrument associated with the payment credential (for example: credit/debit card), financial institution account associated with the payment credential and the like, that the user utilized to initiate the transaction.

The process flow 700 may further comprise determining that the payment credential used to initiate the transaction is not applicable/optimal to process the initiated transaction based on at least the user location and transaction information, as illustrated by block 740. In this regard, the system may analyze the method of payment and one or more parameters associated with the method of payment. In some embodiments, the system may compare the transaction information, for example, the transaction location, to one or more limits associated with the digital wallet, the payment credential, the payment instrument, the financial institution account, the user device and the like to determine whether the transaction information exceeds any of the one or more limits. The one or more limits may be received from the user, determined by the system or received from the financial institution/entity associated with the digital wallet/payment credential. For example, the system may determine that the user initiated a transaction using a payment credential at City A in State B. The system may determine that the payment credential is not applicable for the transaction based on determining that the payment credential is designated for use only in State C. In some embodiments, the system may determine the payment credential utilized to initiate the transaction is not optimal for the transaction. For example, the system may determine that the user initiated a transaction with a first payment credential associated with a first payment instrument in a country A, different from the user's home country B. While the first payment credential may be applicable in country A, the system may determine a second payment credential applicable in Country A and may determine that a second payment instrument associated with the second payment credential provides a better currency exchange rate in comparison with the first payment instrument. Therefore, in some embodiments, the system may determine a second payment credential applicable for a transaction in response to determining that a first payment credential used to initiate a transaction is not applicable for the transaction or based on determining that the second payment credential is more suitable for use for the transaction in comparison with the first payment credential. In this regard, the one or more second payment credentials may provide better benefits/characteristics in comparison to the first payment credential comprising better currency exchange rate, more loyalty points, lesser processing time and purchase offers or greater value or greater interest to the user and the like. In some embodiments, the system may determine a plurality of second payment credentials better suited for the transaction in response to determining that the first payment credential used to initiate the transaction in not optimal and/or applicable for the transaction. In some embodiments, the system may determine the first payment credential and/or the one or more second payment credentials are applicable for a transactions and each provide one or more benefits/offers to the user. The system may rank the first and the one or more second payment credentials based on analyzing each of their benefits according to a predetermined criteria comprising monetary value, user preference, user transaction history and the like.

In some embodiments, the system may compare the transaction information, for example, the transaction location, to one or more limits associated with the digital wallet, the payment credential, the payment instrument, the financial institution account, the user device and the like to determine whether the transaction information exceeds any of the one or more limits. The one or more limits may be received from the user, determined by the system or received from the financial institution/entity associated with the digital wallet/payment credential. For example, the system may determine that the user initiated a transaction using a payment credential for a transaction amount A. The system may determine that the payment credential is not applicable for the transaction based on determining that the payment credential or the payment instrument/financial institution account associated with the payment instrument is designated for only for maximum transaction amount C, lesser than amount A, for a predetermined time period and frequency of use. For example, the system may determine that the account/debit card associated with the payment credential or the payment credential itself has a transaction amount limit M during a period of one week. The system may also determine a user specified limit indicating that the payment credential may be used for a maximum of 3 times during a week. If a transaction amount exceeds the amount limit M, the system may determine that the payment credential is not applicable for the transaction. If the transaction amount A is lesser that the amount limit M during a first transaction of the week, and the deduction of amount A from limit M would result in a balance lower than or close to the minimum threshold balance associated with the credential/the account, the system may determine the that the payment credential is not optimal for the transaction. In either scenarios, the system would seek to determine one or more payment credentials better suited for the transaction as described previously.

Now referring to the high level process flow 800 illustrated in FIG. 8. The process flow 800 may be performed sequentially after or in conjunction with the process flow 700. The system may establish a communication link with the user device associated with the user through a suitable wireless or wired network based on user permissions or by providing requisite credentials. In some embodiments, the system establishes a communication link with the user device utilized to initiate the transaction, while in other embodiments the system establishes a communication link with an auxiliary device connected to the transaction user device or another other suitable device. Next, at block 820, the system may initiate a presentation of a graphical user interface for display on the user device, wherein the graphical user interface comprises one or more payment credentials associated with the user, applicable to process the transaction. In some embodiments the system initiates the presentation of the graphical user interface via a digital wallet application or another application stored on the user device. In this regard, the application may be running on the background of the user device or may be turned off, and the system may transmit control signals via a network, via text message (when the user is offline) or by other means that cause the application to automatically present the graphical user interface on the user device. In some embodiments, the system causes the point of sale terminal to transmit the control instructions to the user device. In some embodiments, the system causes the presentation of the graphical user interface in real time when the user is proximate a point of sale terminal, for example, based on communication between the device and the terminal, while in other embodiments, the system may automatically and in real time, initiate the presentation based on determining that the payment credential used to initiate the transaction is not optimal/applicable to process the transaction. In some embodiments, the system may present the only a portion of the information associated with the graphical user interface and seek authentication credentials from the user before providing additional information. These authentication credentials may be similar to those described elsewhere in the disclosure.

In some embodiments, presentation of the graphical user interface comprises presenting one or more payment credentials determined to be applicable or optimal for the transaction. In this regard, the system may present the one or more payment credentials in a suitable order (value of benefits, prior use, frequency of use and the like), along with one or more benefits associated with the one or more payment credentials. Benefits for the transaction location may comprise, lesser transaction costs, discounts, offers on the transaction or one or more products, better exchange rates, quicker transaction processing, increased loyalty points and the like. In some embodiments, the system may present a comparison of the benefits of the user initiated transaction credential and the one or more determined applicable transaction credentials. In some embodiments, the interface is a personalized interface with audio/visual elements unique to the user and the user transaction history. In some embodiments, the system may analyze one or more digital wallets of the user, stored at one or more locations to identify one or more payment credentials that would be more suitable for the transaction. If the one or more payment credentials are stored on the user device utilized to initiate the transaction, the system may retrieve the payment credentials and the associated information from the storage location and display at least a portion of the information on the graphical user interface. If the payment credentials are stored on external systems, i.e., devices/systems other than the transaction user device like other user devices, third party systems, cloud networks and the like, the system may establish communication links with the storage locations, provide appropriate authorization credentials and retrieve at least a portion of information associated with the payment credentials for display on the user device. In this regard the system may temporarily store the retrieved payment credentials on a secure location of the user device until the user completes the transaction. These steps may be conducted in parallel on one or more processors/one or more database storage locations associated with the system, to reduce processing time and improve efficiency. In some embodiments, the system analyzes the financial accounts and payment instruments of the user and creates new payment credentials better suited for use at the particular location and may "push" or transmit these payment credentials to the user's digital wallet by a short message service (SMS), by near filed communication, by the operative communication channel via the network or any other suitable means, in real time. These new payment credentials may be one-time or multiple use credentials. For example, the system may analyze the user transaction history and determine that the user is associated with a credit card A that is better suited for the user's current location or the transaction amount, based on retrieving offer information from the financial institution system associated with the credit card A. The system may create a new payment credential to enable the user to redeem one or more offers with the transaction, after determining that the user's digital wallets do not comprise at least one payment credential associated with credit card A. In some embodiments the system presents the interface via an intelligent personal assistant and knowledge navigator to enable the user to analyze and perform one or more actions associated with the displayed payment credentials.

Next, the system may receive the graphical user interface, a user selection of at least one payment credential from the one or more payment credentials determined to be applicable to process the transaction, as illustrated by block 830. The user selection may be in the form of gestures, touch patterns, voice commands or any other suitable means. In this regard, for tokens stored externally from the transaction user device, the system may retrieve only a portion of identifying information associated with the payment credential, or necessary information required to determine of the payment credential is optimal/applicable for the transaction. The system may retrieve the remaining information necessary to process the transaction only after receiving the selection from the user, thereby saving memory and processing time. In some embodiments, receiving the user selection is accompanied by receiving authentication credentials from the user. The system then initiates authorization and/or processing of the transaction using the at least one payment credential selection by the user, as illustrated by block 840. In this regard, the system may transmit control signals to the user device to cause the user device to transmit the at least one selected payment credential to the point of sale terminal or the merchant system, such that the transaction can continue with the selected payment credential. In some embodiments, processing of the transaction further comprises applying one or more benefits or offers associated with the transaction. The system may also transmit a notification to the point of sale terminal, the user system and/or the merchant system indicating that that the transaction has been processed using the at least one selected payment credential, as illustrated by block 850. In other embodiments the notification may comprise requests for additional information or credentials from the merchant and/or the user required for the processing of the transaction. The notification may be through text messages, emails, phone calls, vibratory and/or audible alerts or any other suitable notification means.

Referring now to FIG. 9, illustrating a high level process flow 900 for transaction authorization based on user authentication in accordance with some embodiments of the invention. The process flow 900 includes, as represented by block 910, establishing an operative communication link with a point of sale terminal associated with a merchant. In this regard, in some embodiments, the system is in operative communication with the point of sale terminal, a transaction terminal, a user device or any device through which the user seeks to perform a transaction by providing requisite authentication credentials. In some embodiments, the system establishes communication with the point of sale terminal associated with a merchant through a network either directly or via merchant systems or via user devices. In some embodiments, the user device establishes communication with the transaction terminal through near field communication or by any other suitable means. In the embodiments in which the user seeks to initiate an online transaction, the system establishes communication with the user device, for example the user's computing device or mobile device. In some embodiments, establishing an operative communication link comprises enabling access to at least a portion of the databases associated with the point of sale terminal, the merchant system or the user device. In some embodiments, the secure communication link enables the system to transmit control signals, either directly or via the user device, that instruct the point of sale terminal to perform one or more functions.

Next, as illustrated by block 920, the system may receive an indication that the user has initiated a transaction with a first payment credential/financial instrument, wherein the first payment credential is stored in a mobile wallet associated with the user. In some embodiments, the system receives an indication that the user initiated a transaction at the point of sale terminal, in real time, either from a user device, a point of sale terminal or a merchant system associated with the transaction. In some embodiments, the system receives the indication via the established secure operative communication channel. For example, the system may receive an indication that the user initiated a transaction by utilizing a first payment credential associated with a digital wallet either for online or in store transaction. In some embodiments receiving an indication may comprise receiving a request for transaction authorization or verification of authentication credentials of the user, either from the digital wallet application or from the merchant system. In some embodiments, receiving the indication of a transaction may be substantially similar to the embodiments described in block 510. In conjunction with the above step or subsequently, at block 930, the system may receive transaction information associated with the initiated transaction. The transaction information may be received from the point of sale terminal, the user device, the merchant systems, third party payment networks or any other suitable means. In some embodiments, the transaction information comprises one or more parameters associated with the initiated transaction comprising at least a geographic location, a merchant, a merchant category code, a product code, a transaction amount, a method of payment, at least one method of authentication, type of transaction (for example, online or in-store) and the like. In some embodiments, the system may receive or determine the method of payment from the transaction information. The method of payment may comprise the digital wallet, a user device, a payment credential, financial instrument associated with the payment credential (for example: credit/debit card), financial institution account associated with the payment credential and the like, that the user utilized to initiate the transaction.

Next, as illustrated by block 940, the system determines a desired level of authorization associated with the transaction, based on at least the transaction information. In this regard, the system may analyze the transaction information, the user or customer information (for example, contact information) and financial information of the user and/or the transaction history of the user to determine the desired level of authorization required to permit and/or process the transaction, based on one or more factors, singularly or in combination. For example, the system may determine that the transaction amount is above a predetermined threshold value, and hence determine a higher level of desired authorization. As another example, the system may analyze the transaction information and determine a product type/merchant category identifier (for example, groceries/retailer category A) and a transaction location (for example location B of the retailer/merchant) associated with the transaction. The system may further analyze the user's transaction history and determine that the user frequently purchases groceries at the particular location of the merchant, and therefore assign a lower level of desired authorization. In another instance, the system may assign a higher level of desired authorization for online transactions in comparison with the desired level of authorization of in-store transactions for the same merchant. As another example, transactions involving debit cards/savings accounts or transaction credentials/financial instruments associated with debit cards/savings accounts may comprise a higher desired level of authorization in comparison with those associated with credit cards. In some embodiments, a continuum of desired levels of authorization may be used to quantify (or dictate) the number or context in which transactions are permitted. For example, the continuum of desired levels of authorization may range from zero authorization required to the highest authorization required, with one or more progressive authorization levels in between. These desired authorization levels may be identified by alpha numeric identifiers, pictorial identifiers, or any other suitable way. For example, level A may be the highest desired authorization level with levels B-D progressively leading to the lowest desired authorization level E. Although illustrated as comprising five levels, the continuum may comprise more or fewer levels.

The system then determines at least one method of authentication associated with the first payment credential, wherein the at least one method of authentication comprises one or more authentication credentials provided by the user to authenticate the use of a payment credential or a financial instrument, as illustrated by block 950. In some embodiments, the at least one method of authentication comprises the authentication method that the user utilized to authenticate themselves to the transaction user device utilized to initiate the transaction or an auxiliary device in communication with the transaction user device, prior to, at the beginning of or during the transaction session. In some embodiments, the at least one method of authentication comprises the method of authentication utilized by the user for authentication to a point of sale terminal for an in-store transaction or to a merchant system for an online transaction. In some embodiments, the at least one method of authentication is the method of authentication utilized to enable access to/to enable one or more functions associated with the digital wallet application or another application of the user device. In some embodiments the user may be authenticated by receiving and analyzing authentication credentials comprising biometric information of the user, for example, fingerprint scans, iris recognition, retina scans, facial recognition, hand geometry, voice recognition and the like. In some embodiments the user may be authenticated based on authentication credentials comprising behavioral characteristics like device usage patterns, movement/orientation of the user device, typing rhythm, gait, gestures, heart rate and other characteristics. In some embodiments the user may be authenticated based on pre-authenticated auxiliary devices, for example a user in continued possession of a pre-authenticated auxiliary device (for example, a wearable device) in operative communication with the user device may be authenticated based on continued monitoring of the user device and the auxiliary device. In some embodiments the user may be authenticated based on received userID and passcodes with pictorial and/or alphanumeric data. Further, in some situations, challenge questions, familiar pictures and/or phrases, biometrics, key fob-based alphanumeric codes and/or collocation, authentication of another application such as a similar application or an "overarching" application, and/or the like may be used as methods of authentication.

In some embodiments each of the at least one authentication method described above may be assigned a user authorization level as illustrated by block 960, and the at least one authentication methods may be used singularly or in combination to achieve a desired level of authorization. The different methods of authentication may provide differing degrees of confidence regarding the authentication using such types and thus the different methods of authentication may be associated with different user authorization levels. For example, if a username by itself is used for a first user authentication, and a username along with a password is used for a second authentication, then the second authentication should provide a higher level of authorization because of the additional layer of authentication required. Further, within the types of authentication, varying levels of authorization may be used. For example, when using a password, the system may require the user to create a password according to strict rules designed to increase the security level of the password, and therefore increase the confidence and user authorization level of any authentication using the password. As another example, the authentication method based on biometric information of the user may be determined to comprise a higher level of user authorization, in comparison with another method comprising a passcode or a swipe pattern since biometric information cannot be reproduced as easily. In another instance, a session initiated by the user by providing one or more authentication credentials at a predetermined time period before the initiation of the transaction or to another auxiliary device/application may be assigned a lower user authorization level in comparison with a session in which the user provides the one or more authentication credentials after the initiation of the transaction and/or to the digital wallet interface or the point of dale terminal associated with the merchant system.

Accordingly, a continuum of authentication may be used to quantify (or dictate) the levels of authentication. For example, the continuum of desired levels of may range from zero user authorization level requiring no authentication credentials to a highest user authorization level requiring one or more authentication credentials with high confidence, with one or more progressive authorization levels in between. These user authorization levels may be identified by alpha numeric identifiers, pictorial identifiers, or any other suitable way. For example, level A may be the highest user authorization level with levels B-D progressively leading to the lowest user authorization level E. Although illustrated as comprising five levels, the continuum may comprise more or fewer levels. For example, level E may be a "zero authentication" level requiring no authentication credentials, while in the other hand level A may be a "hard authentication" requiring full authentication credentials or the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed above with reference to desired authorization levels, the continuum of user authorization may be coupled with the continuum of desired authorization as illustrated by block 970. Different levels of user authorization may be required different levels of desired authorization for processing/allowing the transaction. For example, in some cases a "soft" authentication may be required when the user performs a recurring transaction with a merchant known to the system and/or the financial institution. As another example, a "hard" authentication may be required when the user seeks to create a new payment credential for a transaction, when the user seeks to change one or more parameters associated with the user's payment credentials/financial institution accounts or when the user initiates a transaction outside a geo-fence/geographic perimeter designated to be the user's customary geo-fence. In some embodiments each authorization level in the desired authorization continuum corresponds to one or more levels in the user authorization continuum and vice versa, while in other embodiments at least a portion of the continua are distinct.

Therefore, in some embodiments, the system determines a desired level of authorization associated with the transaction initiated by the user. The system then determines a user level of authorization achieved by the user based on the authentication credentials provided by the user accompanying a payment credential/financial instrument. Next at block 970, the system determines whether the first payment credential is eligible/optimal to process the transaction, wherein determining further comprises comparing the desired level of authorization related to the transaction with the user authorization level associated with the first payment credential/financial instrument. In this regard, in some embodiments, the continua may be coupled with one another such that the various authorization levels along the continua intersect at specific points of the coupled continuum. For example, one continuum may be moved left or right with respect to the other continuum in order to achieve a different relationship between the desired authentication level to permit the transaction and the available user authorization level. Accordingly, for a given coupling, a specific level on the desired authorization continuum provides that a particular transaction may be permitted given that a specified level of authorization is achieved by the credentials supplied by the user, as indicated by a corresponding level on the user authorization continuum. For example, the system and/or the user may arrange the continua with respect to one another and may adjust the arrangement based on changing desires or goals. In some embodiments, one or both the continua may have weighted scales such that, as a level on the continuum is moved, the corresponding transactions permitted and/or level of authentication required may change exponentially or otherwise. Furthermore, in various embodiments, other representations of the various transactions permitted that correspond with the various levels of user authentication may be used by the invention.

Referring now to FIG. 10, illustrating a high level process flow 1000 for transaction authorization based on user authentication in accordance with some embodiments of the invention. Typically in some embodiments, if the user authentication level associated with the first payment credential/financial instrument matches the desired level of authorization associated with the transaction, the system allows the transaction at block 1080. However, the process flow 1000 also includes, as represented by block 1010, determining that the first payment credential is not optimal/eligible for processing the transaction, based on determining that the user authentication level associated with the first payment credential/financial instrument does not match the desired level of authorization associated with the transaction. In some embodiments, the user authentication level is higher than the desired authentication level for the transaction as illustrated by 1020. In such instances the system authorizes the transaction using the first payment credential/financial instrument and enables the processing of the transaction. In other embodiments, the system may choose a second payment credential indicating that a more trusted method of authentication was used. The system may replace the first payment credential with the second payment credential and transmit the second payment credential to the point of sale terminal of the transaction terminal instead to continue the transaction ay block 1080. The second payment credential may enable quicker processing/settlement of the transaction, processing with fewer rules, with fewer/relaxed limits or the like. In some embodiments, the system transmits a notification that the user authentication level is higher than the desired authentication level for the transaction to a financial institution system associated with the first payment credential. In this regard the notification may cause the financial institution system to process/settle the transaction quicker, with fewer rules or limits, instead of transmitting the second payment credential. The second payment credential may be substantially similar to the first payment credential in some instances. For example, the second payment credential may be directed to the financial institution account and/or the financial instrument associated with the first payment credential. In some embodiments, the system may analyze one or more digital wallets of the user, stored at one or more locations to identify the second payment credential indicating that the user authentication level is higher than the desired authentication level for the transaction. In some embodiments, the system analyzes the financial accounts and payment instruments of the user and creates a new payment credential for the second payment credential and may "push" or transmit the second payment credential to the user's digital wallet by a short message service (SMS), by near filed communication, by the operative communication channel via the network or any other suitable means, in real time. These second payment credential may be one-time or multiple use credential.

In some embodiments, the user authentication level is lower than the desired authentication level for the transaction. In such instances the system may initiate a presentation of one or more payment credentials associated with the user, via a graphical user interface displayed on the user device, the one or more payment credentials being eligible to process the transaction as illustrated by block 1030. In some embodiments, the system may determine one or more second payment credentials that are associated with a desired authorization level that matches the existing user authorization level associated with the user authentication method. For example, the system may determine a second payment credential that has been pre-authenticated for the transaction amount or the merchant associated with the transaction, either by the user or by the system/financial institution associated with the second payment credential. Next the system may receive via the graphical user interface, a user selection of a payment credential at block 1040. In some embodiments, the presentation of the one or more payment credentials via a graphical user interface may be substantially similar to the steps 810-830 described previously.

Alternatively, on determining that the user authentication level is lower than the desired authentication level for the transaction, the system may request one or more additional authentication credentials from the user via the established communication link with the point of sale terminal of the merchant at block 1050. For example, the system may determine that the user provided a passcode to initiate a transaction with the first payment credential stored in the digital wallet. However, the system may determine that an additional credential comprising a personal identification number associated with the payment credential would be required to achieve a user authorization level that matches the desired authorization of the transaction. As another example, the system may request the user to provide a fingerprint either on the user device or on the transaction terminal. As another example, the system may transmit a one-time pass code to a user device registered with the user and request the user to provide the one-time passcode at the point of sale terminal. In some embodiments, the system may transmit control instructions to the user device and request and/or receive the one or more additional authentication credentials from the user device. In some embodiments, the system may transmit control instructions to the merchant system/the point of sale terminal that cause the merchant systems/the point of sale terminal to request and/or receive additional authentication credentials from the user. Next, the system may validate the one or more additional authentication credentials, as illustrated by block 1060. Validation of the one or more additional authentication credentials may comparing the received credentials those retrieved from databases associated with the system or the financial institution associated with the user. Furthermore, the system may determine that the first payment credential is eligible to process the transaction based on at least successfully validating the one or more received authentication credentials at block 1070.

The system then initiates authorization and/or processing of the transaction using the payment credential, as illustrated by block 1080. In this regard, the system may transmit control signals to the user device to cause the user device to transmit the payment credential to the point of sale terminal or the merchant system, such that the transaction can continue with the selected payment credential. The system may also transmit a notification to the point of sale terminal, the user system and/or the merchant system indicating that that the transaction has been processed using the at least one selected payment credential, as illustrated by block 1090. In other embodiments the notification may comprise requests for additional information or credentials from the merchant and/or the user required for the processing of the transaction. The notification may be through text messages, emails, phone calls, vibratory and/or audible alerts or any other suitable notification means.

As detailed elsewhere in the disclosure, the processes flows described above may be performed by the system server 208, the merchant system 206, $3^{rd}$ party systems like other financial institution systems associated with the merchant accounts, payment routing associations and the like (not illustrated), the user system 204, either entirely or partially. To further illustrate this, a high level process flow 1100 for automatic and real time utilization of payment credentials based on transaction parameters is illustrated in FIG. 11. The high level process flow may be conducted by a mobile wallet application installed on a user device. In some embodiments, the mobile wallet application may be in communication with other applications/parts of the user device and one or more external systems. The steps of process flow 1100 may be substantially similar to those described previously in the disclosure. The mobile wallet application stored on the user device is hereinafter referred to as "the application".

FIG. 11 illustrates establishing an operative communication link between a point of sale terminal associated with a merchant and a user device comprising a mobile wallet application at block 1110. In some embodiments, the application causes the user device to establish communication with the transaction terminal through near field communication or by any other suitable means, by providing requisite permissions, authentication, identification or the like. In some embodiments, the application may automatically cause the creation of the operative communication link between a point of sale terminal associated with a merchant and a user device, when the user is within a predetermined proximity to a transaction terminal or a point of sale terminal associated with the merchant. In some embodiments, the automatically present an interface to the user on the user device, when the user is in within a predetermined proximity to the terminal. The interface may be visual, auditory, tactile, or a combination. In this regard the application by also alert the user to view the interface by vibratory/auditory notifications or other means. In some embodiments, the application seeks the user's permission before establishing the communication.

Next, block 1120 illustrates receiving an indication that a user has initiated a transaction. In some embodiments, the user may indicate that he/she wishes to initiate a transaction at the point of sale terminal by choosing one or more options presented to the user on the user interface if the user device. In some embodiments, receiving an indication comprises receiving permission from the user to establish an operative communication link between a point of sale terminal associated with a merchant and a user device.

The process flow 1100 may include retrieving transaction information associated with the initiated transaction, wherein the transaction information comprises one or more transaction parameters, the one or more transaction parameters comprising a geographic location and a transaction amount, at block 1130. In this regard, the application may receive transaction information from the point of sale terminal via the established communication link, in some embodiments. While in other embodiments, the application may receive the transaction information through the merchant systems or from the user.

Typically, once the merchant receives a payment credential for completion of a transaction, the merchant transmits the payment credential to a financial institution for authorization and/or processing and settlement. In this regard, the financial institution may need to determine additional details to authorize and/or authenticate the transaction or to determine confidence in the transaction. In other instances, the transaction parameters may dictate the offers to be applied, the number of verifications conducted or the method of processing used to process the transactions. The methods of processing the transactions may include providing temporary authorizations before completion of verification of the transaction, allowing the transaction only after complete verification of the transaction and the like. For example, the system may receive an indication that a transaction was conducted at location C, with a payment credential associated with a user. The system may then verify the location of the user by various means and then provide temporary authorization. As another example the system may receive authentication credentials of the user via the merchant and compare them with a retrieved credential from a database before further processing of the transaction. Therefore, processing of the transactions requires various steps that are time consuming, that require retrieval and processing of large amounts of data from various sources. The present invention provides a solution to the above problem by providing an application on the user device that automatically determines and transmits optimal payment credentials based on transaction parameters, such the receiving financial institution systems may process the transactions in a quick, efficient manner and in real time. In this regard the invention leverages existing infrastructure to improve the processing efficiency and processing speed of the transaction without requiring additional devices or attachments while ensuring proper verification and authorization of the transactions.

At block 1140, the application determines one or more payment credentials applicable to process the transaction based on analyzing at least the transaction information, the one or more payment credentials being associated with the user, wherein each of the one or more payment credentials are associated with at least one correlated transaction parameter of the one or more transaction parameters. In this regard, one or more payment credentials associated with the user may be correlated with one or more transaction parameters. In some embodiments, the payment credentials may be correlated with a transaction amount. For example, payment credential A may be associated/correlated for use within a first transaction amount range while payment credential B may be correlated for use for a second transaction amount range greater than the first range. Typically, the financial institution may processes the transactions differently depending on the transaction amount. For example, transactions with large amounts of funds may be processed with more rules. When the user initiates a transaction, the application may determine that the transaction amount of the initiated transaction is within the first range and transmit the payment credential A for the processing of the transaction. The financial institution may recognize that payment credential A is earmarked for lower transaction amounts, and may instantaneously provide temporary authorization for completion of the transaction, and instead performing complete verification before settlement. In this regard, the system may determine a plurality of payment credentials associated with the user (either existing or may create new credentials) and identify that each of the credentials are correlated with a maximum transaction amount or amount range and choose one or more credentials with maximum transaction amounts that are appropriate for the current transaction. Similarly, in some embodiments, the payment credentials may be correlated with geographic areas. For example some payment credentials P1 may be associated with City A while other payment credentials P2 may be associated with City B. The application may choose payment credentials based on determining if the transaction location is associated with City A or if the location is situated within City B. The financial institution may receive payment credential P1 and recognize that the user is within City A and may process the transaction accordingly. For example, the system apply an offer available only in city A. In some embodiments, determining one or more optimal payment credentials is done in addition to the conventional methods of processing and verification described above. In this instance, the determining one or more optimal payment credentials adds an additional layer of security to the transactions and augments the confidence in the transactions. For example, on receiving the payment credential P2, the financial institution system may recognize that the user is in City B. The system may then also determine the user's location by other means described in the specification or by conventional means and compare it with the location City B from payment credential P2. The system may allow the transaction based on the added verification.

In other embodiments, the system may process transactions differently based on receiving payment credentials associated with user authentication methods described above. For example, the application may transmit a first type of payment credential when the user authenticates themselves with their fingerprint and a second payment credential when the user provides a passcode. On receiving the first type of payment credential, the financial institution system may determine that the user utilized an authentication method with a high level of user authorization and the system may then provide a temporary authorization for the transaction or allow completion of the transaction. Therefore, the financial institution system does not require access to the finger print credentials of the user, since the application validates the authentication credentials before transmitting the payment credential. Therefore, the privacy of the user's personal information is maintained. On receiving the second type of payment credential, the financial institution system may recognize that the user utilized an authentication method with a lower level of user authorization and the system may request additional authentication in real time or process the transaction with higher rules. Therefore, the present invention enables processing of transactions in the optimal manner based on transaction parameters and processing the transactions in a quick and efficient manner with adequate verification.

Block 1150 illustrates initiating, automatically, a presentation of a graphical user interface for display on the user device, wherein the graphical user interface comprises the one or more payment credentials applicable to process the transaction. The presentation of the interface may be substantially similar to the instances described elsewhere in this disclosure. Subsequently, the system may receive via the graphical user interface, a user selection of at least one payment credential from the one or more payment credentials determined to be applicable to process the transaction, as illustrated by block 1160. The application may then cause the transmission of the at least one payment credential to the point of sale terminal, via the established link at block 1170.

It will further be understood that a system as contemplated herein can be configured to perform any of the portions of the process flows 500-1000 and/or 1100 upon or after one or more triggering events (which, in some embodiments, is one or more any of the portions of the process flows 500-1000 and/or 1100). As used herein, "triggering event" refers to an event that automatically triggers the execution, performance, and/or implementation of a triggered action, either immediately, nearly immediately, or sometime after (e.g., within minutes, etc.) the occurrence of the triggering event. For example, in some embodiments, the system performing any of the portions of the process flows 500-1000 and/or 1100 is configured such that the system receiving an indication of a compromised payment vehicle or a potential exposure to loss (the triggering event) automatically and immediately or nearly immediately triggers the system to automatically (without human intervention) generate a payment credential for facilitating or completing a pending purchase transaction (the triggered action).

Also it will be understood that, in some embodiments, a predetermined time and/or the passage of a predetermined per any of the portions of the process flows 500-1000 and/or 1100. Of course, any of the embodiments described and/or contemplated herein can involve one or more triggering events, triggered actions, automatic actions, and/or human actions. In addition, it will be understood that, in some embodiments, a system performing any of the portions of the process flows 500-1000 and/or 1100 (and/or a user thereof) is configured to perform each portion of the process flows 500-1000 and/or 1100 from start to finish, within moments, seconds, and/or minutes (e.g., within approximately 10-15 minutes, etc.). In some embodiments, any of the portions of the process flows 500-1000 and/or 1100 are performed in real time, in substantially real time, and/or at one or more predetermined times. Further, it will be understood that the number, order, and/or content of any of the portions of the process flows 500-1000 and/or 1100 are exemplary and may vary. It will further be understood that the any of the portions of the process flows 500-1000 and/or 1100 can be configured to perform any one or more of the portions of any one or more of the embodiments described and/or contemplated herein.

In various embodiments of the invention, transaction limits and/or thresholds may be used. For example, transaction limits may be used to determine whether a payment credential has been exposed and/or whether to approve or deny a transaction. If a transaction (e.g., transaction information) fails to meet a limit, the transaction may be denied. Alternatively, if a transaction (e.g., transaction information) meets a limit, then the transaction may be allowed.

While the system has been described as determining whether the transaction meets the limits and thereby determining whether an exposure has occurred, in some embodiments filters for determining exposure may also be responsive to transaction information. For example, exceptions to filters may allow a transaction even if a filter is not met. In an embodiment, the system evaluates the transaction information to determine: (1) does the transaction meet the limits; and (2) if the transaction does not meet the limits, does the transaction qualify for an exception to the limits. If the system determines that a positive response to either query, then transaction may be allowed.

In some embodiments, the exceptions are based at least in part upon the transaction information. For example, the system may determine that a transaction does not meet a category limit because doing so would cause the payment credential to exceed the category limit for the time period. In this example, however, the system also determines that the payment credential is near, e.g., within one week, within three days, within one day, or the like, the expiration date of the token or the current evaluation period for the payment credential and that the payment credential has remaining funds in a different category. Given the short period of time remaining for the expenses to be made, the system may determine that the transaction falls within an exception and allow the transaction. In another example, the system may determine that the user is outside of geographic limits defined by a route. The system, however, determines that the user has conducted a transaction at the merchant frequently in the past and therefore allows the transaction based on the previous number of transactions at the merchant. These examples use multiple types of transaction information, e.g., the date of the transaction, the location of the transaction, the category of the transaction, the amount of the transaction, and the like, to determine if the exceptions apply. In some embodiments, only a single piece of transaction information applies. For example, the system may always permit transactions that are associated with a specific category, for example, emergency expenses. The system may always permit transactions at emergency rooms, doctors' offices, and the like.

In some embodiments, the exceptions are determined by the system and/or the user. For example, the system may provide a list of exceptions based on the user's transaction history. If the user has a favorite coffee shop, the system may allow transactions at the coffee shop up to a certain amount even if the transaction would not meet a limit. The user or an administrator may provide exceptions based on location or other transaction information. For example, the user may input exceptions that allow transactions within a specific region, e.g., a city that would not be allowed outside of the specific region. The exceptions may be changed at any time by the system or user.

The exceptions may be limited by frequency, amount, percentage of the limit, or the like. For example, a transaction may qualify for an exception but only up to a certain percentage of the funds remaining in a related category. For example, a transaction may qualify for an exception because the expense period for the token is almost expired and there are remaining funds in a first category. The system may permit a transaction in a second category up to some percentage (e.g., 50%) of the funds remaining in the first category.

The transaction-responsive limits are designed to provide flexibility to the system and better serve the user. The transaction-responsive limits may be tailored to the user or generic to the token and/or system. By providing for transaction-responsive limits, the system allows transactions that would otherwise be denied based on binary yes/no limits when the transaction information indicates the appropriateness of the transaction.

In some embodiments, the system determines one or more offers associated with transactions performed using the payment credentials. The system may display the one or more offers associated with one or more payment credentials and/or the wallets on the payment credential dashboard. In some embodiments, the system automatically applies the suitable offers to transactions performed using the integrated interface, while in other embodiments the system receives a selection of a suitable offer from the user. In some embodiments, the integrated interface enables the user to monitor and redeem loyalty points accrued from at least one transaction executed using the integrated interface. In some embodiments, the interface enables the user to monitor and/or modify pending transactions associated with payment credentials. In some embodiments, the system enables the user to retrieve transaction history associated with one or more payment credentials.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for non-intrusive geo location determination for transaction authorization, whereby the apparatus enables authorization of at least one transaction associated with a user, based on at least determining a congruence of a user location and a transaction location, without retrieving geographic location coordinates from a user device, whereby the apparatus enables automatic and real time utilization of one or more payment credentials applicable for a transaction initiated by the user, the apparatus comprising:
   at least one memory;
   at least one processor; and
   a module stored in the memory, executable by the at least one processor, and configured to cause the at least one processor to:
      establish an operative communication link between a point of sale terminal associated with a merchant and the user device comprising a mobile wallet application;
      receive an indication that the user has initiated a transaction;
      retrieve transaction information associated with the initiated transaction, wherein the transaction information comprises one or more transaction parameters, the one or more transaction parameters comprising a geographic location and a transaction amount;
      implement non-intrusive geo location determination for authenticating the at least one transaction, comprising transmitting one or more polar queries related to the at least one transaction structured such that the one or more polar queries can be answered, automatically by the user device, in affirmative or in negative and validating the transaction based on (i) a polar query reply received from the user device in affirmative or in negative and (ii) without retrieving geographic location coordinates of the user device;
      determine one or more payment credentials stored in a mobile wallet application of the user device applicable to process the transaction based on analyzing at least the transaction information, the one or more payment credentials being associated with the user, wherein each of the one or more payment credentials are associated with at least one correlated transaction parameter of the one or more transaction parameters;
      initiate, automatically, a presentation of a graphical user interface for display on the user device, wherein the graphical user interface comprises the one or more payment credentials applicable to process the transaction, wherein initiating the presentation of the graphical user interface comprises:
         in response to determining that the mobile wallet application is turned off or is running in the background on the user device, transmitting an activation control signal to the user device to cause the mobile wallet application to present the graphical user interface, in real time via a network;
      receive via the graphical user interface, a user selection of at least one payment credential from the one or more payment credentials determined to be applicable to process the transaction; and
      transmit via the established operative communication link between the point of sale terminal and the user device, the at least one payment credential to the point of sale terminal;
      wherein, the transmitted at least one payment credential is configured to enable an external system to process the transaction based on the at least one correlated transaction parameter.

2. The apparatus of claim 1, wherein the at least one correlated transaction parameter is the transaction amount, wherein determining the one or more payment credentials applicable to process the transaction comprises:
   determining a plurality of payment credentials associated with the user, wherein each of the plurality of payment credentials are associated with one or more transaction amount parameters, the one or more transaction amount parameters comprising a maximum transaction amount; and
   determining the one or more payment credentials of the plurality of payment credentials, based on determining that the one or more transaction amount parameters associated with each of the one or more payment credentials are applicable for the transaction amount of the transaction;

wherein the each of the one or more payment credentials are configured to enable the external system to process the transaction in accordance with the transaction amount.

3. The apparatus of claim 2, wherein the one or more transaction amount parameters further comprise a time period associated with the transaction amount, frequency of use during the time period and minimum threshold balance.

4. The apparatus of claim 1, wherein the at least one correlated transaction parameter is the geographic location, wherein determining the one or more payment credentials applicable to process the transaction comprises:
　determining a plurality of payment credentials associated with the user, wherein each of the plurality of payment credentials are associated with a geographic area; and
　determining the one or more payment credentials of the plurality of payment credentials, based on determining that the geographic location of the transaction is within the geographic area associated with each of the one or more payment credentials;
　wherein the each of the one or more payment credentials are configured to enable the external system to process the transaction in accordance with the geographic location.

5. The apparatus of claim 4, wherein the one or more payment credentials comprise one or more characteristics, the one or more characteristics comprising currency exchange rate, loyalty points, processing time and purchase offers.

6. The apparatus of claim 1, wherein module is further configured to cause the at least one processor to:
　determine a method of authentication associated with the transaction, wherein the method of authentication comprises one or more authentication credentials provided by the user at the user device, wherein determining the method of authentication further comprises:
　　requesting the one or more authentication credentials from the user via the graphical user interface of the user device; and
　　receiving, the one or more authentication credentials from the user; and
　determine a level of user authorization associated with the method of authentication.

7. The apparatus of claim 6, wherein the at least one correlated transaction parameter is the level of user authorization, wherein determining the one or more payment credentials applicable to process the transaction comprises:
　determining a plurality of payment credentials associated with the user, wherein each of the plurality of payment credentials are associated with a credential authorization level; and
　determining the one or more payment credentials of the plurality of payment credentials, based on determining that the level of user authorization matches the credential authorization level;
　wherein the each of the one or more payment credentials are configured to enable the external system to process the transaction in accordance with the level of user authorization.

8. A method for non-intrusive geo location determination for transaction authorization, whereby at least one processor enables authorization of at least one transaction associated with a user, based on at least determining a congruence of a user location and a transaction location, without retrieving geographic location coordinates from a user device, whereby the at least one processor enables automatic and real time utilization of one or more payment credentials applicable for a transaction initiated by a user, the method comprising:
　establishing, by the at least one processor, an operative communication link between a point of sale terminal associated with a merchant and the user device comprising a mobile wallet application;
　receiving, by the at least one processor, an indication that the user has initiated a transaction;
　retrieving, by the at least one processor, transaction information associated with the initiated transaction, wherein the transaction information comprises one or more transaction parameters, the one or more transaction parameters comprising a geographic location and a transaction amount;
　implementing, by the at least one processor, non-intrusive geo location determination for authenticating the at least one transaction, comprising transmitting one or more polar queries related to the at least one transaction structured such that the one or more polar queries can be answered, automatically by the user device, in affirmative or in negative and validating the transaction based on (i) a polar query reply received from the user device in affirmative or in negative and (ii) without retrieving geographic location coordinates of the user device;
　determining, by the at least one processor, one or more payment credentials stored in a mobile wallet application of the user device applicable to process the transaction based on analyzing at least the transaction information, the one or more payment credentials being associated with the user, wherein each of the one or more payment credentials are associated with at least one correlated transaction parameter of the one or more transaction parameters;
　initiating, by the at least one processor, automatically, a presentation of a graphical user interface for display on the user device, wherein the graphical user interface comprises the one or more payment credentials applicable to process the transaction, wherein initiating the presentation of the graphical user interface comprises:
　in response to determining that the mobile wallet application is turned off or is running in the background on the user device, transmitting an activation control signal to the user device to cause the mobile wallet application to present the graphical user interface, in real time via a network;
　receiving, by the at least one processor, via the graphical user interface, a user selection of at least one payment credential from the one or more payment credentials determined to be applicable to process the transaction; and
　transmitting, by the at least one processor, via the established operative communication link between the point of sale terminal and the user device, the at least one payment credential to the point of sale terminal;
　wherein, the transmitted at least one payment credential is configured to enable an external system to process the transaction based on the at least one correlated transaction parameter.

9. The method of claim 8, wherein the at least one correlated transaction parameter is the transaction amount, wherein determining the one or more payment credentials applicable to process the transaction comprises:
　determining a plurality of payment credentials associated with the user, wherein each of the plurality of payment credentials are associated with one or more transaction amount parameters, the one or more transaction amount parameters comprising a maximum transaction amount; and determining the one or more payment credentials of the plurality of payment credentials, based on determining that the one or more transaction amount parameters associated with each of the one or more payment credentials are applicable for the transaction amount of the transaction;

wherein the each of the one or more payment credentials are configured to enable the external system to process the transaction in accordance with the transaction amount.

10. The method of claim 9, wherein the one or more transaction amount parameters further comprise a time period associated with the transaction amount, frequency of use during the time period and minimum threshold balance.

11. The method of claim 8, wherein the at least one correlated transaction parameter is the geographic location, wherein determining the one or more payment credentials applicable to process the transaction comprises:

determining a plurality of payment credentials associated with the user, wherein each of the plurality of payment credentials are associated with a geographic area; and determining the one or more payment credentials of the plurality of payment credentials, based on determining that the geographic location of the transaction is within the geographic area associated with each of the one or more payment credentials;

wherein the each of the one or more payment credentials are configured to enable the external system to process the transaction in accordance with the geographic location.

12. The method of claim 11, wherein the one or more payment credentials comprise one or more characteristics, the one or more characteristics comprising currency exchange rate, loyalty points, processing time and purchase offers.

13. The method of claim 8, wherein the method further comprises:

determining, by the at least one processor, a method of authentication associated with the transaction, wherein the method of authentication comprises one or more authentication credentials provided by the user at the user device, wherein determining the method of authentication further comprises:

requesting the one or more authentication credentials from the user via the graphical user interface of the user device; and receiving, the one or more authentication credentials from the user; and determining, by the at least one processor, a level of user authorization associated with the method of authentication.

14. The method of claim 13, wherein the at least one correlated transaction parameter is the level of user authorization, wherein determining the one or more payment credentials applicable to process the transaction comprises:

determining a plurality of payment credentials associated with the user, wherein each of the plurality of payment credentials are associated with a credential authorization level; and determining the one or more payment credentials of the plurality of payment credentials, based on determining that the level of user authorization matches the credential authorization level;

wherein the each of the one or more payment credentials are configured to enable the external system to process the transaction in accordance with the level of user authorization.

15. A computer program product for non-intrusive geo location determination for transaction authorization, whereby the computer program product enables authorization of at least one transaction associated with a user, based on at least determining a congruence of a user location and a transaction location, without retrieving geographic location coordinates from a user device, whereby the computer program product enables automatic and real time utilization of one or more payment credentials applicable for a transaction initiated by a user, the computer program product comprising a non-transitory computer-readable medium comprising code that when executed causes a first apparatus to:

establish an operative communication link between a point of sale terminal associated with a merchant and the user device comprising a mobile wallet application;

receive an indication that the user has initiated a transaction;

retrieve transaction information associated with the initiated transaction, wherein the transaction information comprises one or more transaction parameters, the one or more transaction parameters comprising a geographic location and a transaction amount;

implement non-intrusive geo location determination for authenticating the at least one transaction, comprising transmitting one or more polar queries related to the at least one transaction structured such that the one or more polar queries can be answered, automatically by the user device, in affirmative or in negative and validating the transaction based on (i) a polar query reply received from the user device in affirmative or in negative and (ii) without retrieving geographic location coordinates of the user device;

determine one or more payment credentials stored in a mobile wallet application of the user device applicable to process the transaction based on analyzing at least the transaction information, the one or more payment credentials being associated with the user, wherein each of the one or more payment credentials are associated with at least one correlated transaction parameter of the one or more transaction parameters;

initiate, automatically, a presentation of a graphical user interface for display on the user device, wherein the graphical user interface comprises the one or more payment credentials applicable to process the transaction, wherein initiating the presentation of the graphical user interface comprises:

in response to determining that the mobile wallet application is turned off or is running in the background on the user device, transmitting an activation control signal to the user device to cause the mobile wallet application to present the graphical user interface, in real time via a network;

receive via the graphical user interface, a user selection of at least one payment credential from the one or more payment credentials determined to be applicable to process the transaction; and transmit via the established operative communication link between the point of sale terminal and the user device, the at least one payment credential to the point of sale terminal;

wherein, the transmitted at least one payment credential is configured to enable an external system to process the transaction based on the at least one correlated transaction parameter.

16. The computer program product of claim 15, wherein the at least one correlated transaction parameter is the transaction amount, wherein determining the one or more payment credentials applicable to process the transaction comprises:
   determining a plurality of payment credentials associated with the user, wherein each of the plurality of payment credentials are associated with one or more transaction amount parameters, the one or more transaction amount parameters comprising a maximum transaction amount; and
   determining the one or more payment credentials of the plurality of payment credentials, based on determining that the one or more transaction amount parameters associated with each of the one or more payment credentials are applicable for the transaction amount of the transaction;
   wherein the each of the one or more payment credentials are configured to enable the external system to process the transaction in accordance with the transaction amount.

17. The computer program product of claim 16, wherein the one or more transaction amount parameters further comprise a time period associated with the transaction amount, frequency of use during the time period and minimum threshold balance.

18. The computer program product of claim 15, wherein the at least one correlated transaction parameter is the geographic location, wherein determining the one or more payment credentials applicable to process the transaction comprises:
   determining a plurality of payment credentials associated with the user, wherein each of the plurality of payment credentials are associated with a geographic area; and
   determining the one or more payment credentials of the plurality of payment credentials, based on determining that the geographic location of the transaction is within the geographic area associated with each of the one or more payment credentials;
   wherein the each of the one or more payment credentials are configured to enable the external system to process the transaction in accordance with the geographic location.

19. The computer program product of claim 15, wherein the non-transitory computer-readable medium causes the first apparatus to:
   determine a method of authentication associated with the transaction, wherein the method of authentication comprises one or more authentication credentials provided by the user at the user device, wherein determining the method of authentication further comprises:
      requesting the one or more authentication credentials from the user via the graphical user interface of the user device; and
      receiving, the one or more authentication credentials from the user; and
   determine a level of user authorization associated with the method of authentication.

20. The computer program product of claim 19, wherein the at least one correlated transaction parameter is the level of user authorization, wherein determining the one or more payment credentials applicable to process the transaction comprises:
   determining a plurality of payment credentials associated with the user, wherein each of the plurality of payment credentials are associated with a credential authorization level; and
   determining the one or more payment credentials of the plurality of payment credentials, based on determining that the level of user authorization matches the credential authorization level;
   wherein the each of the one or more payment credentials are configured to enable the external system to process the transaction in accordance with the level of user authorization.

* * * * *